Figure 1:
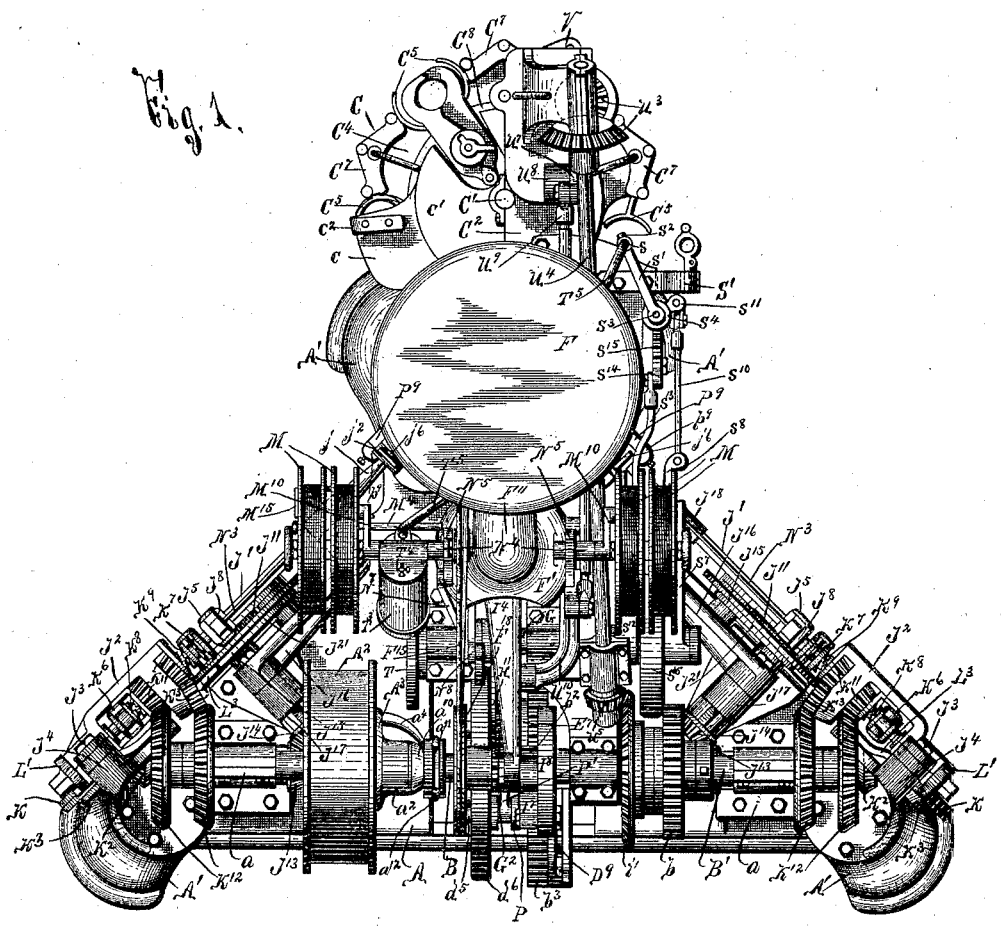

(No Model.) 32 Sheets—Sheet 1.

S. WILE & H. LA CASSE.
BOTTLING MACHINE.

No. 477,617. Patented June 21, 1892.

Witnesses
H. E. Chase,
W. H. Randall

Inventors
Sol Wile & Henry La Casse
By
Wilkinson & Parens
Attorneys (No Model.)

32 Sheets—Sheet 6.

S. WILE & H. LA CASSE.
BOTTLING MACHINE.

No. 477,617. Patented June 21, 1892.

Witnesses
H. E. Chase,
W. H. Randall.

Inventors
Sol. Wile
Henry La Casse
By their Attorneys
Hay, Wilkins and Parsons (No Model.) 32 Sheets—Sheet 7.
S. WILE & H. LA CASSE.
BOTTLING MACHINE.
No. 477,617. Patented June 21, 1892.
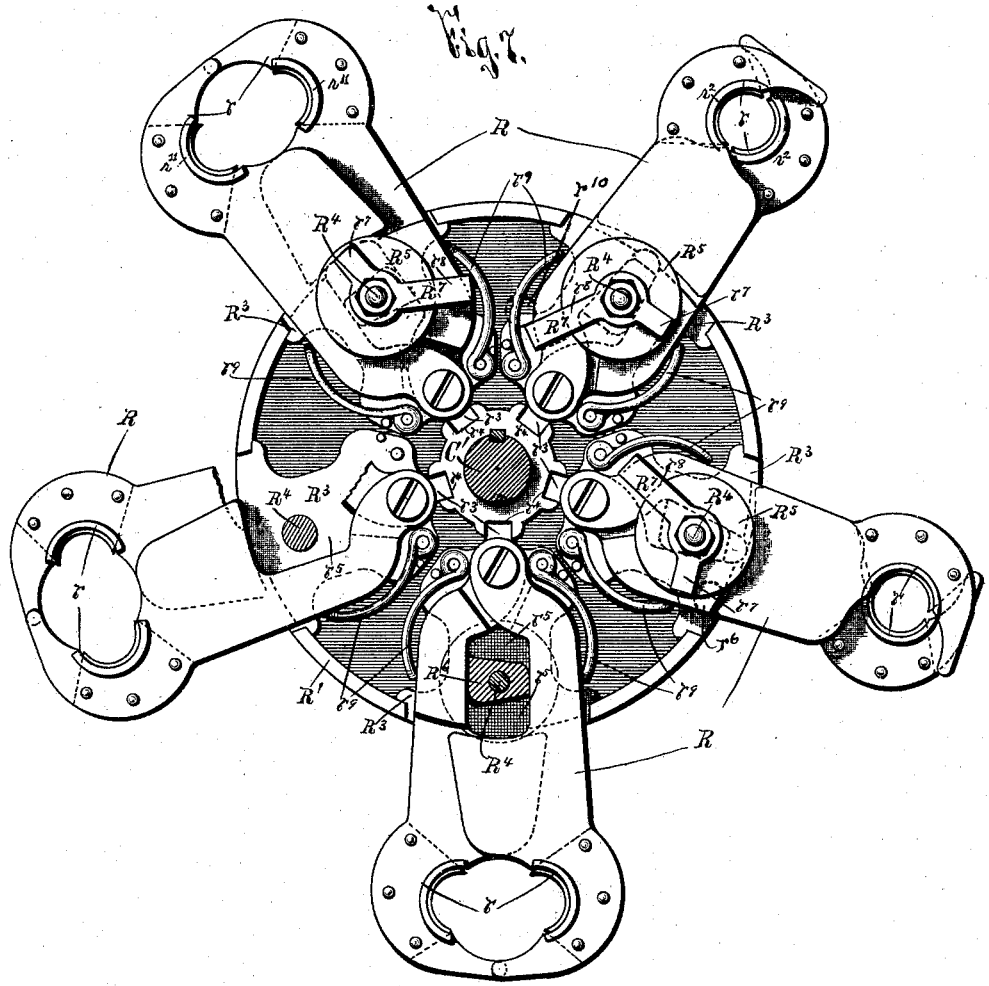

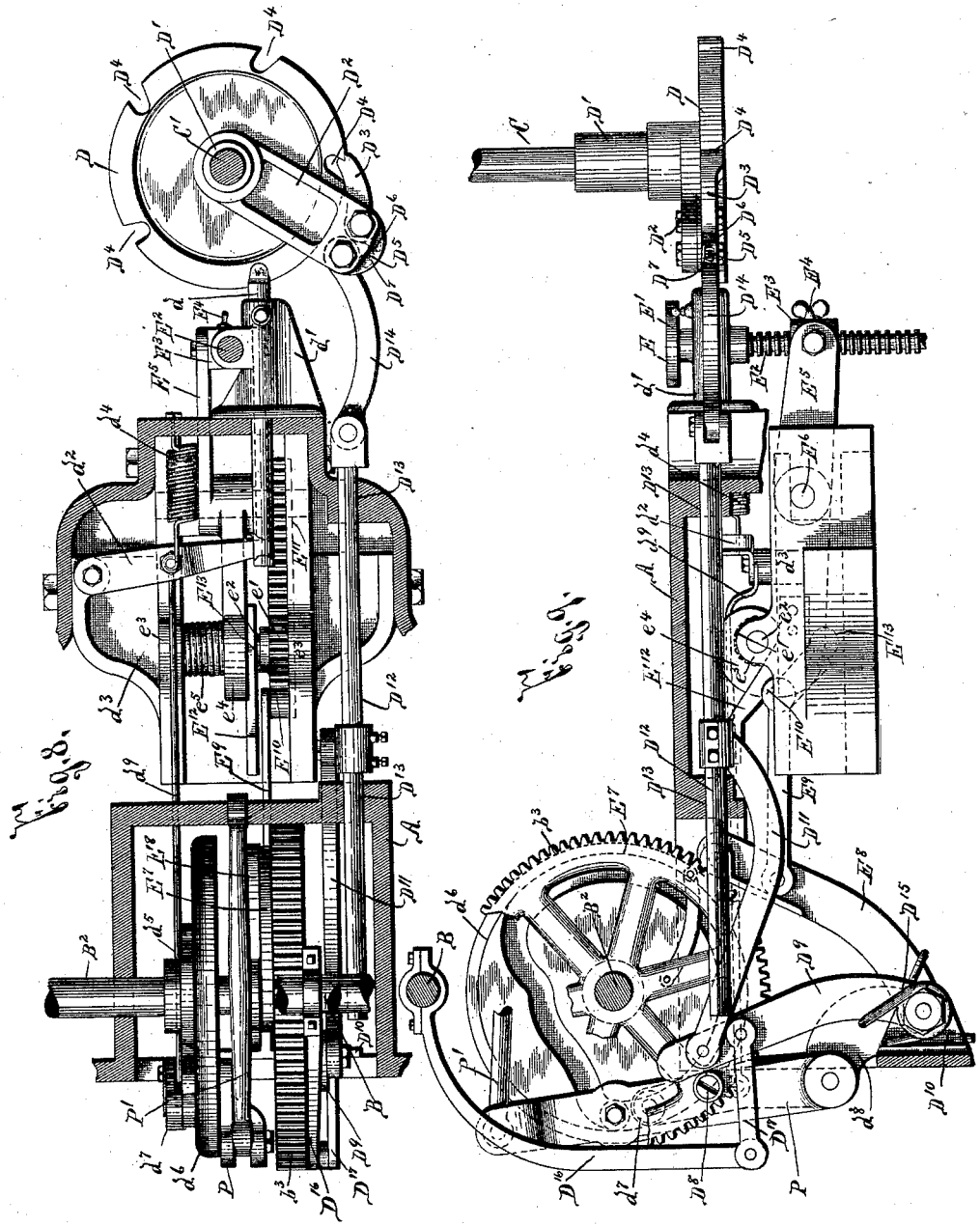

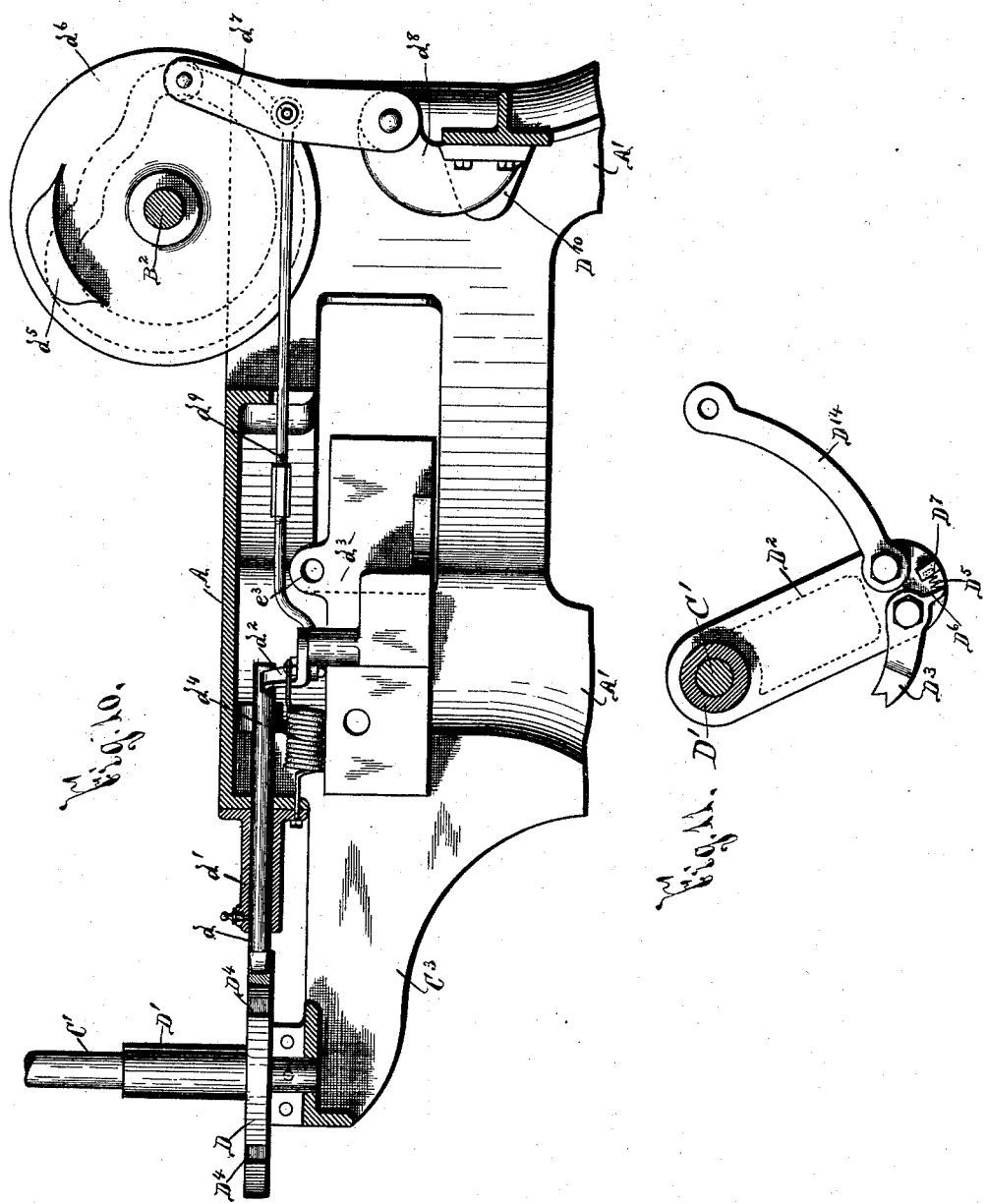

(No Model.) 32 Sheets—Sheet 10.
S. WILE & H. LA CASSE.
BOTTLING MACHINE.
No. 477,617. Patented June 21, 1892.
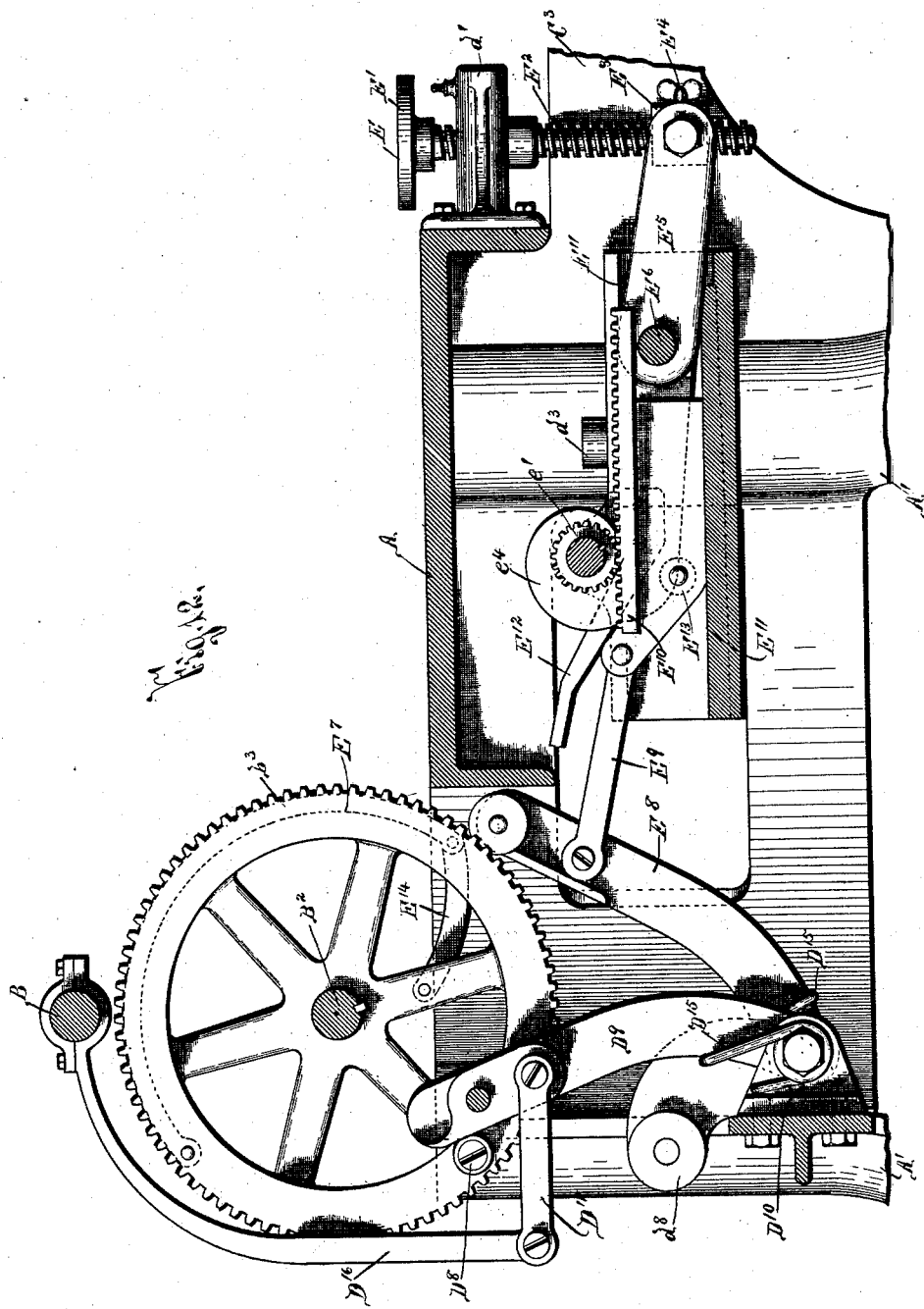
Witnesses
H. E. Chase,
W. H. Randall,
Inventors
Sol Wile
Henry La Casse
By their Attorneys
Hey Wilkinson Parsons

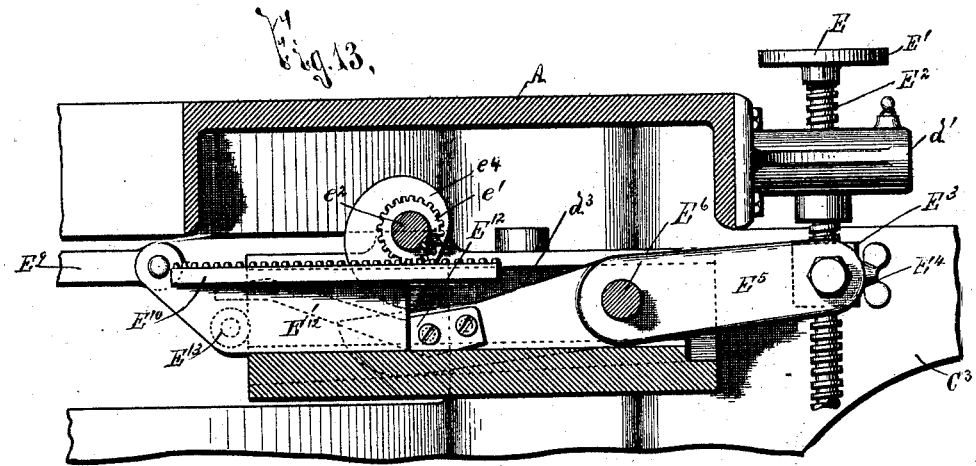

(No Model.) 32 Sheets—Sheet 12.

S. WILE & H. LA CASSE.
BOTTLING MACHINE.

No. 477,617. Patented June 21, 1892.

Witnesses
H. E. Chase,
W. H. Randall,

Inventors
Sol Wile & Henry La Casse
By their Attorneys

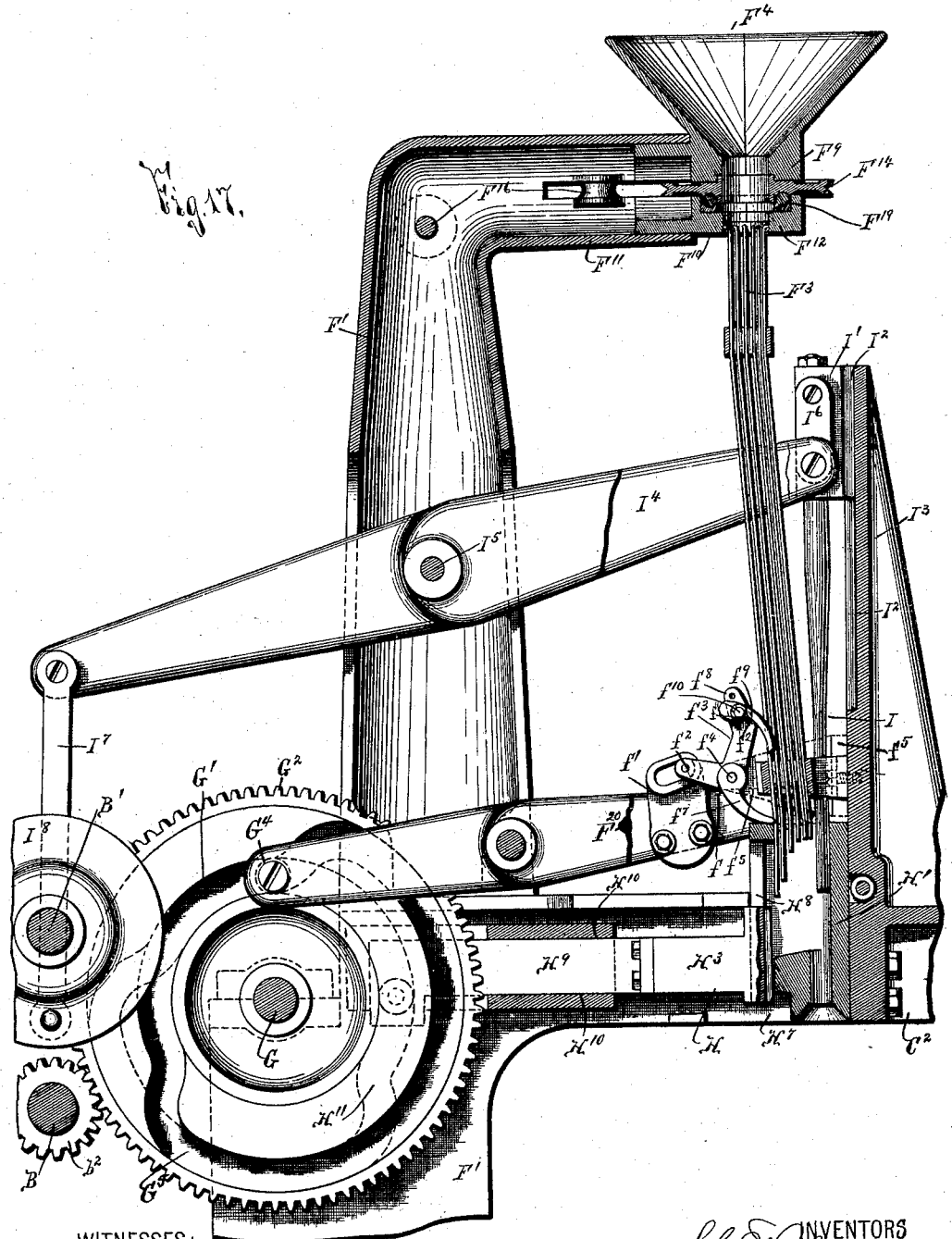

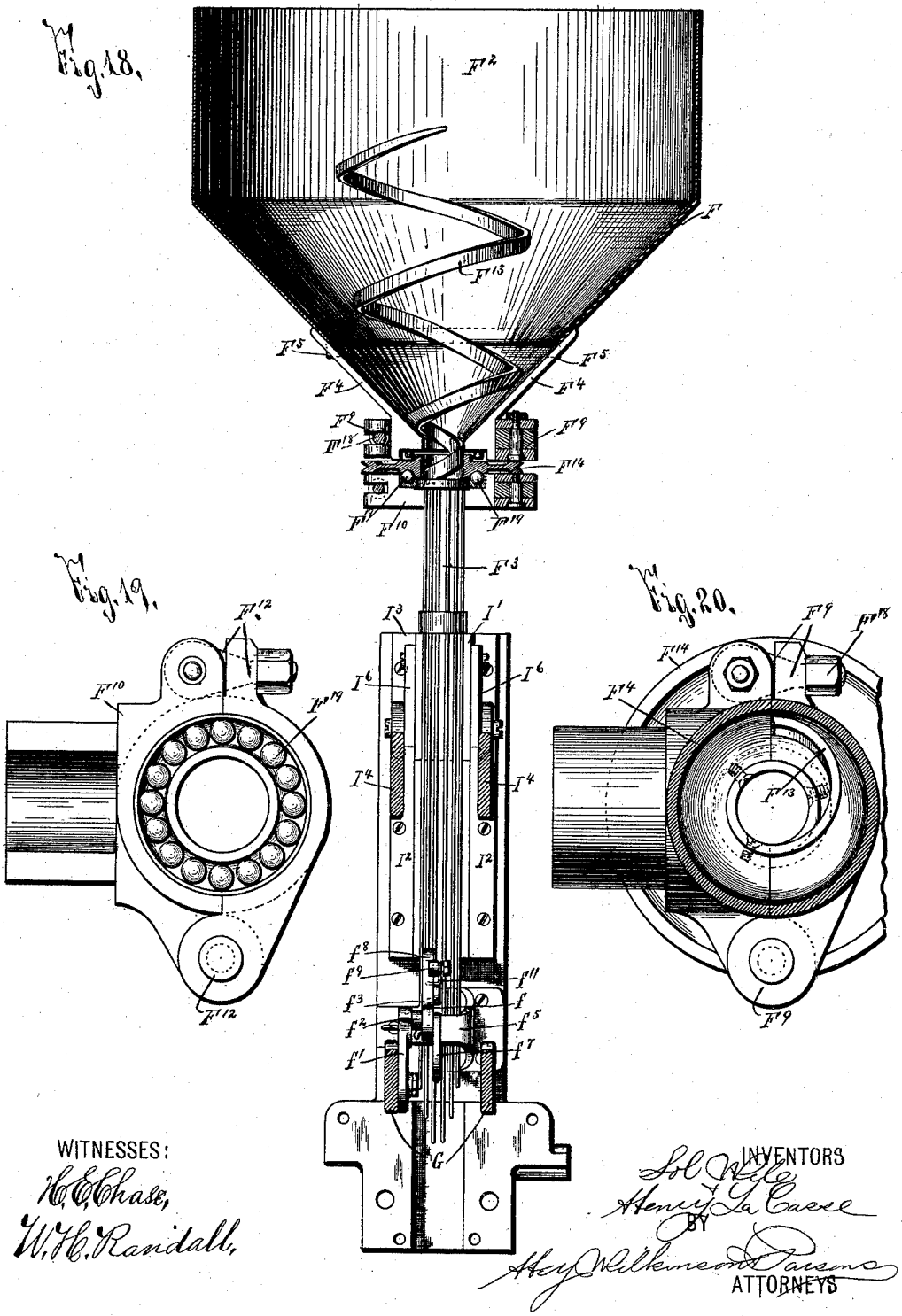

(No Model.) 32 Sheets—Sheet 15.

S. WILE & H. LA CASSE.
BOTTLING MACHINE.

No. 477,617. Patented June 21, 1892.

Witnesses
W. H. Randall
H. E. Chase

Inventors
Sol Wile
Henry La Casse
By their Attorneys (No Model.) 32 Sheets—Sheet 16.

S. WILE & H. LA CASSE.
BOTTLING MACHINE.

No. 477,617. Patented June 21, 1892.

WITNESSES:
W. H. Randall,
H. E. Chase.

INVENTORS
Sol Wile
Henry La Casse
BY
Wilkinson
ATTORNEYS (No Model.) 32 Sheets—Sheet 17.
S. WILE & H. LA CASSE.
BOTTLING MACHINE.

No. 477,617. Patented June 21, 1892.

Witnesses
H. E. Chase,
W. H. Randall,

Inventors.
Sol Wile
Henry La Casse
By Wilkinson & Pavin
Attorneys.

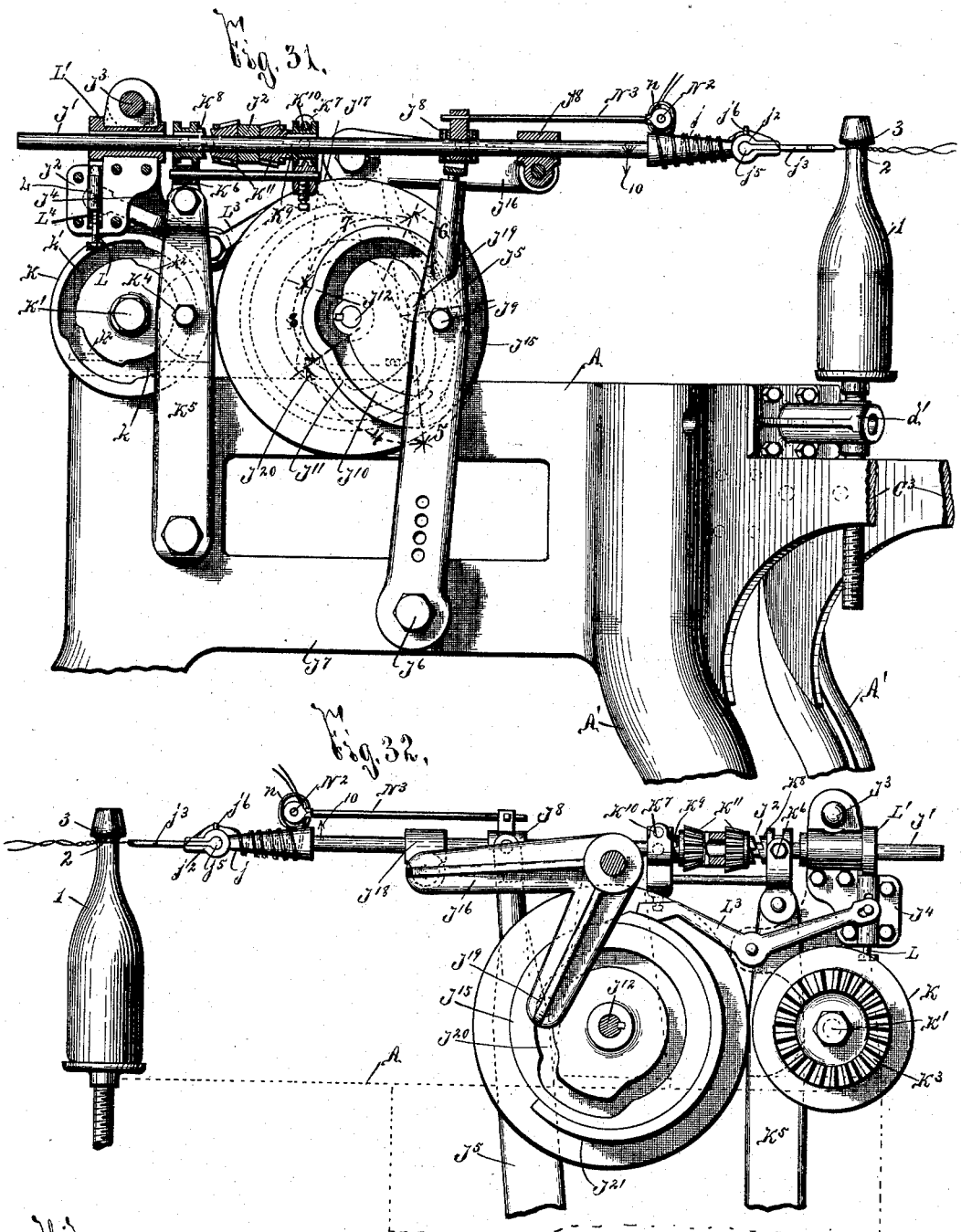

(No Model.)
32 Sheets—Sheet 19.
S. WILE & H. LA CASSE.
BOTTLING MACHINE.
No. 477,617. Patented June 21, 1892.
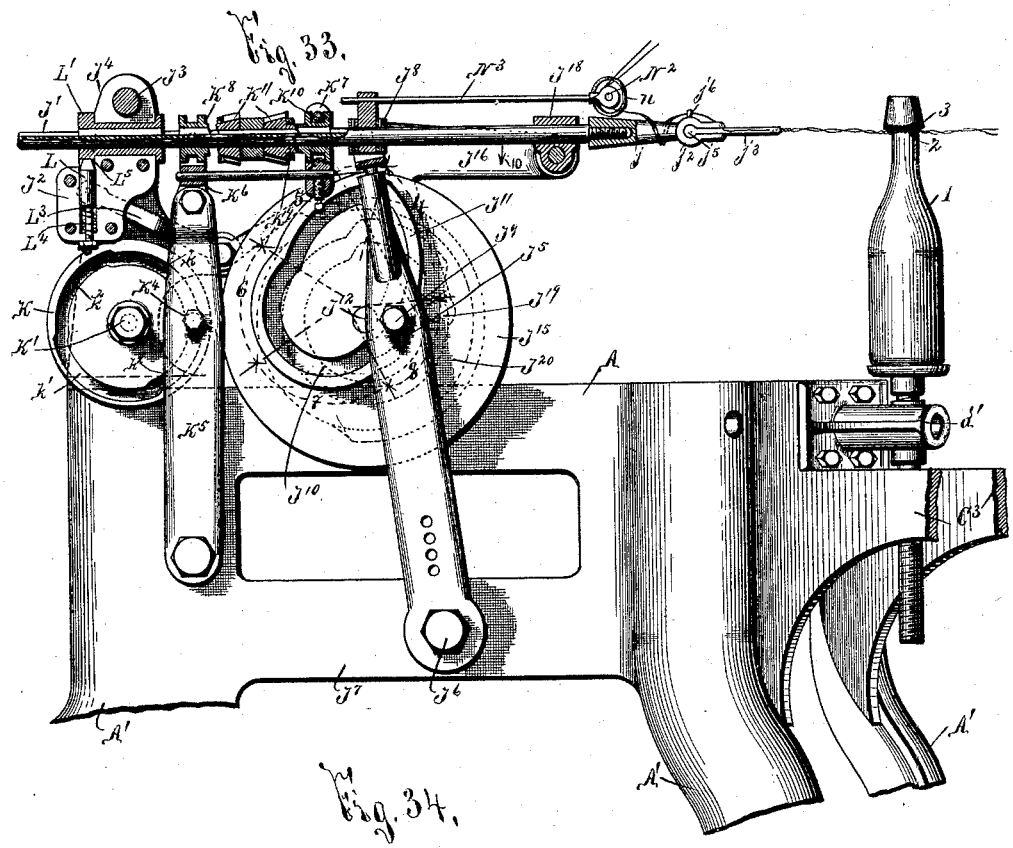
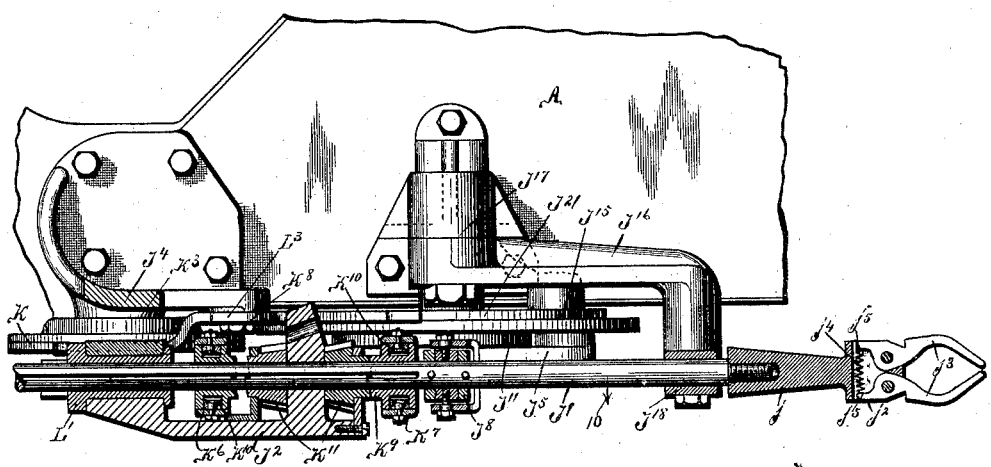

(No Model.) 32 Sheets—Sheet 20.
S. WILE & H. LA CASSE.
BOTTLING MACHINE.
No. 477,617. Patented June 21, 1892.
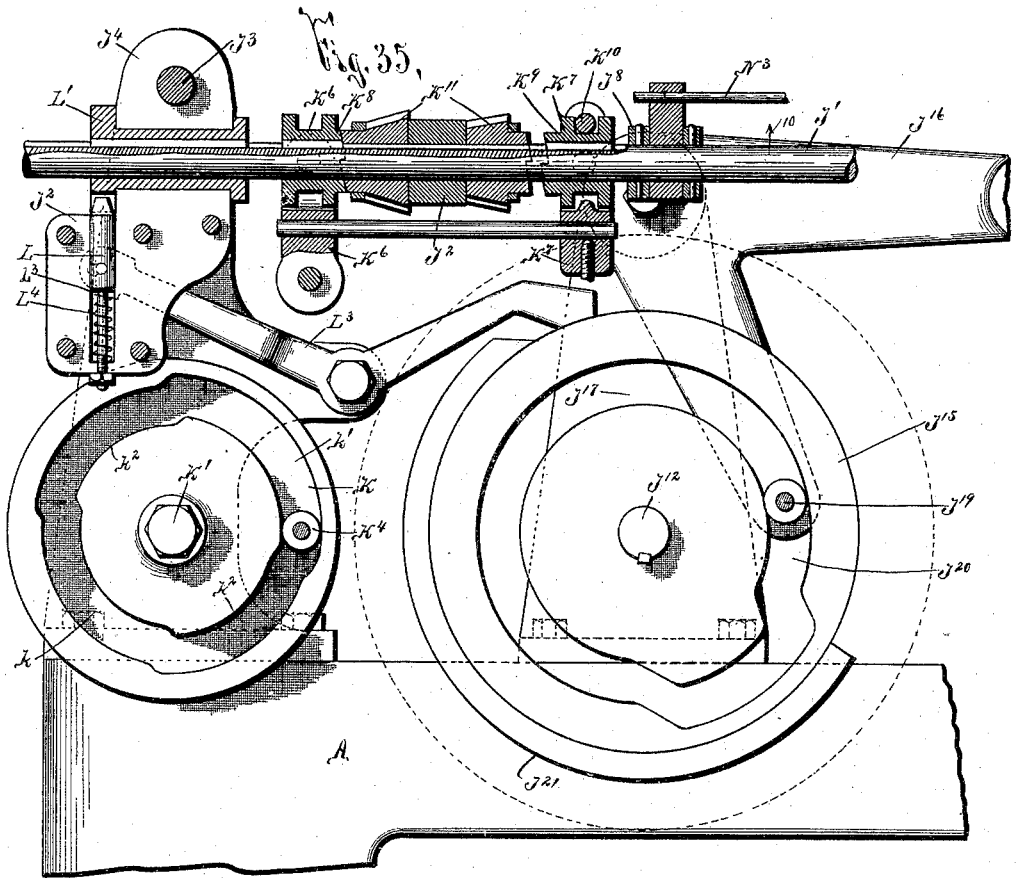
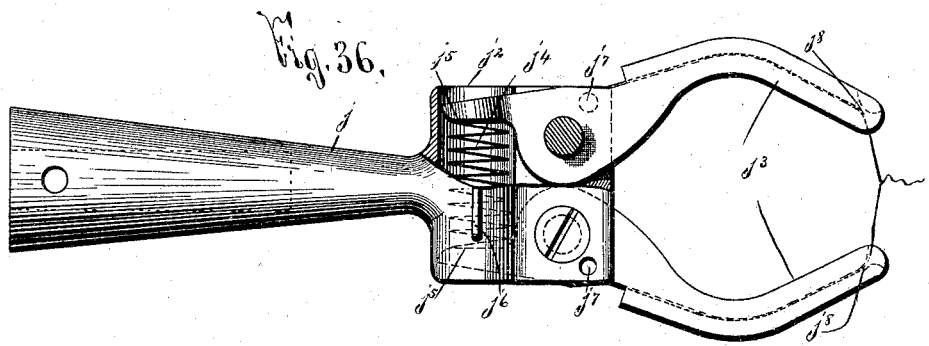
Witnesses.
H. E. Chase,
W. H. Randall,
Inventors
Sol Wile &
Henry La Casse
by
Attorneys

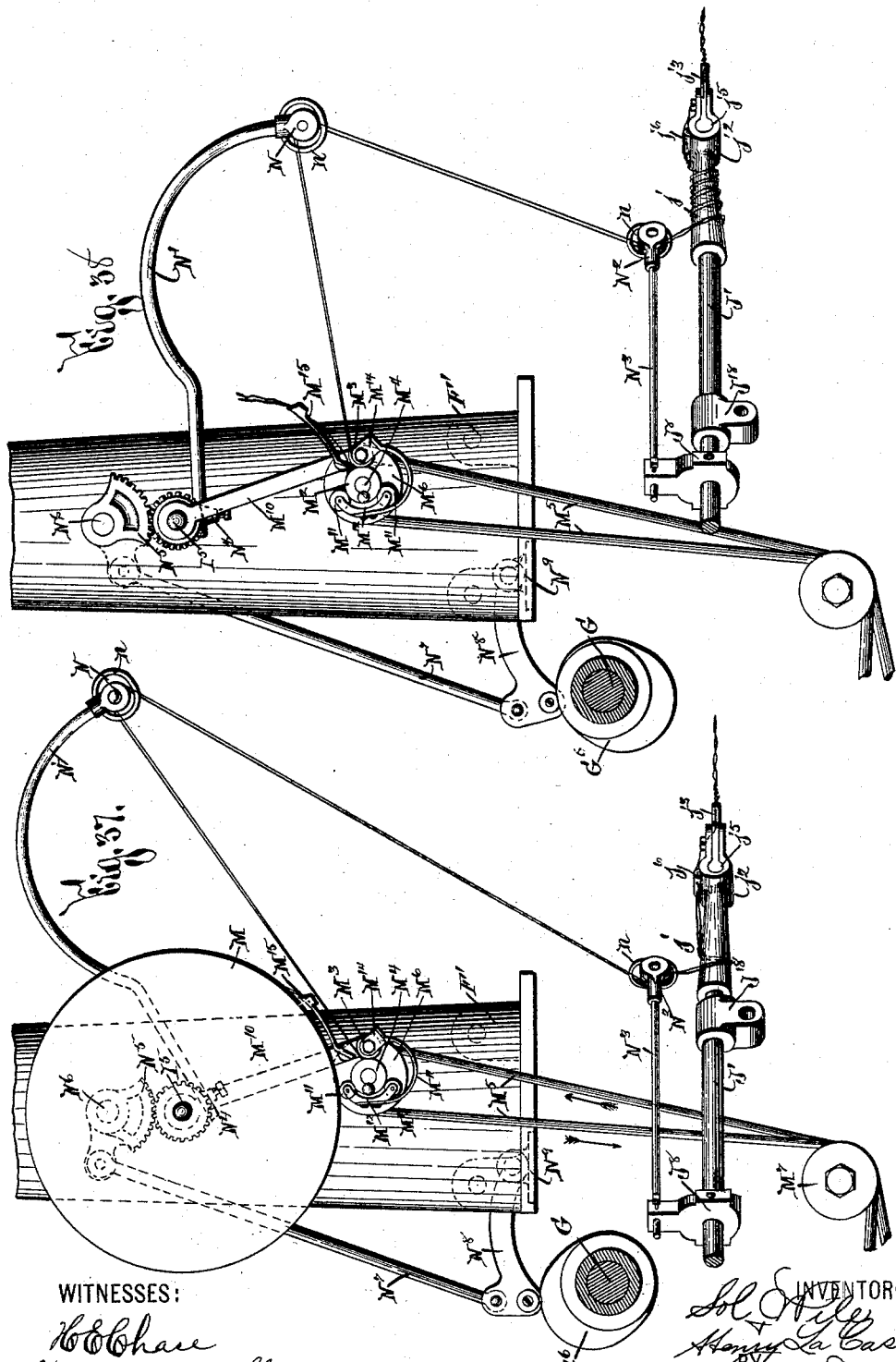

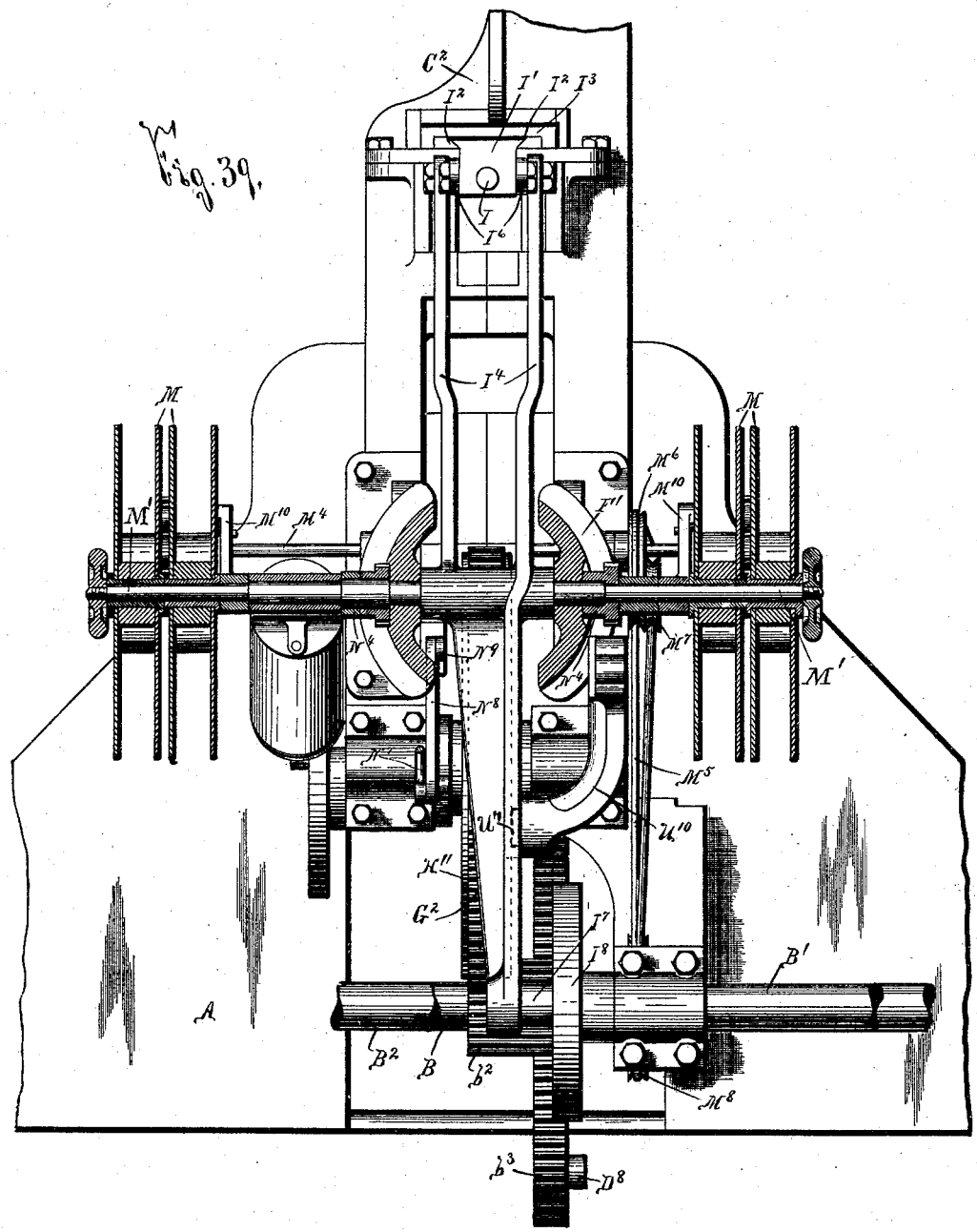

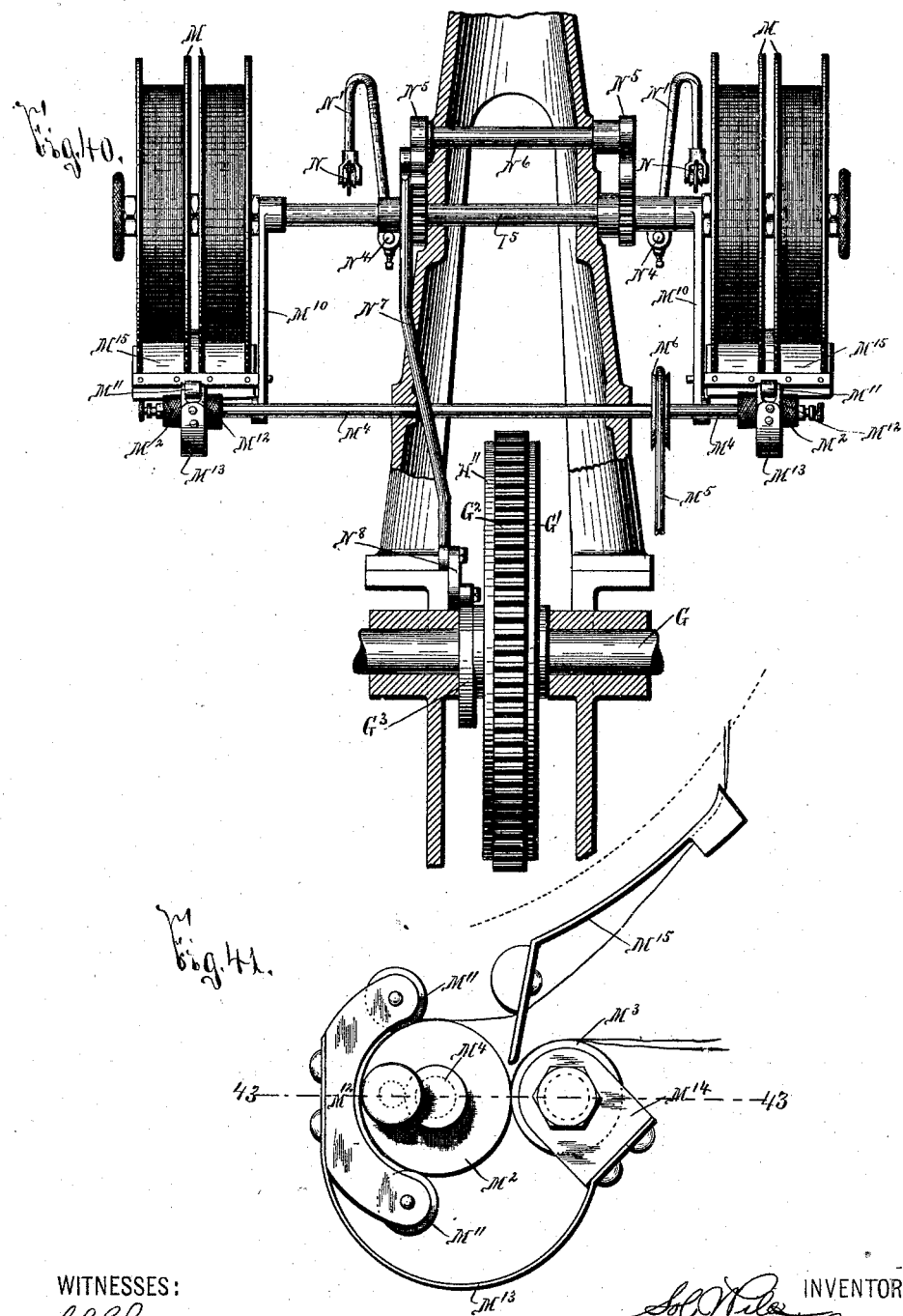

(No Model.)

32 Sheets—Sheet 24.

S. WILE & H. LA CASSE.
BOTTLING MACHINE.

No. 477,617. Patented June 21, 1892.

WITNESSES:

INVENTORS

ATTORNEYS

THE NORRIS PETERS CO., PHOTO-LITHO., WASHINGTON, D. C.

(No Model.)
32 Sheets—Sheet 25.
S. WILE & H. LA CASSE.
BOTTLING MACHINE.
No. 477,617. Patented June 21, 1892.
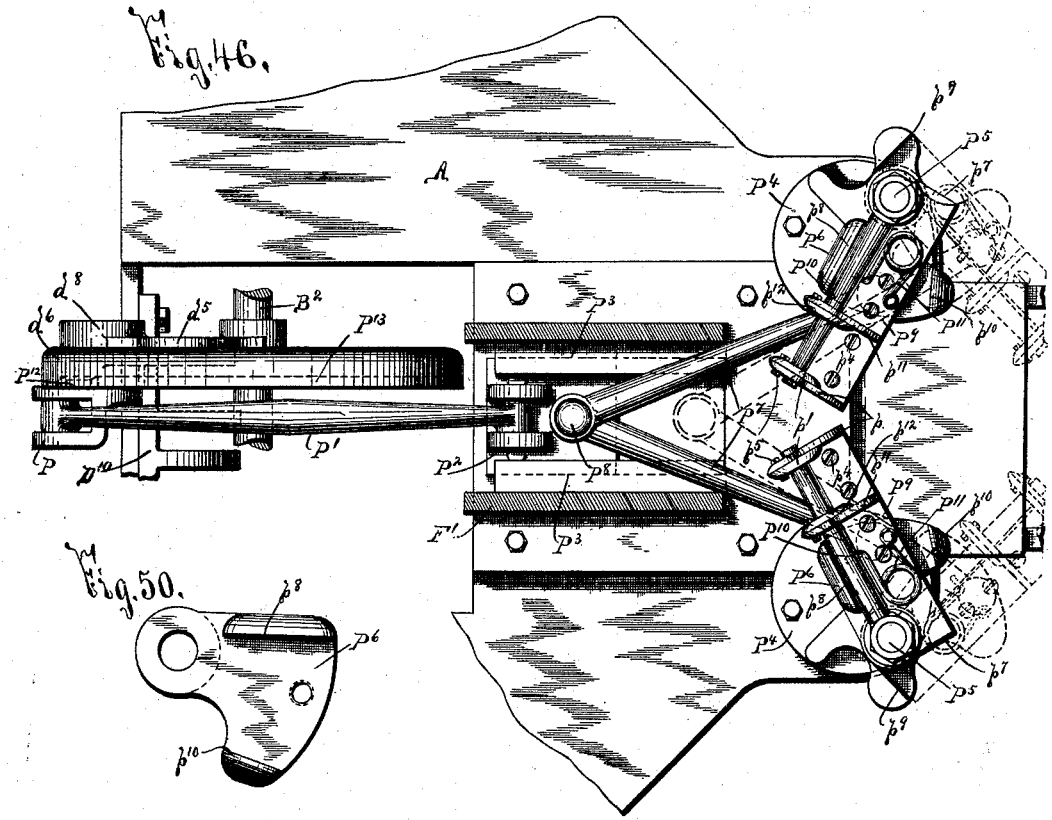
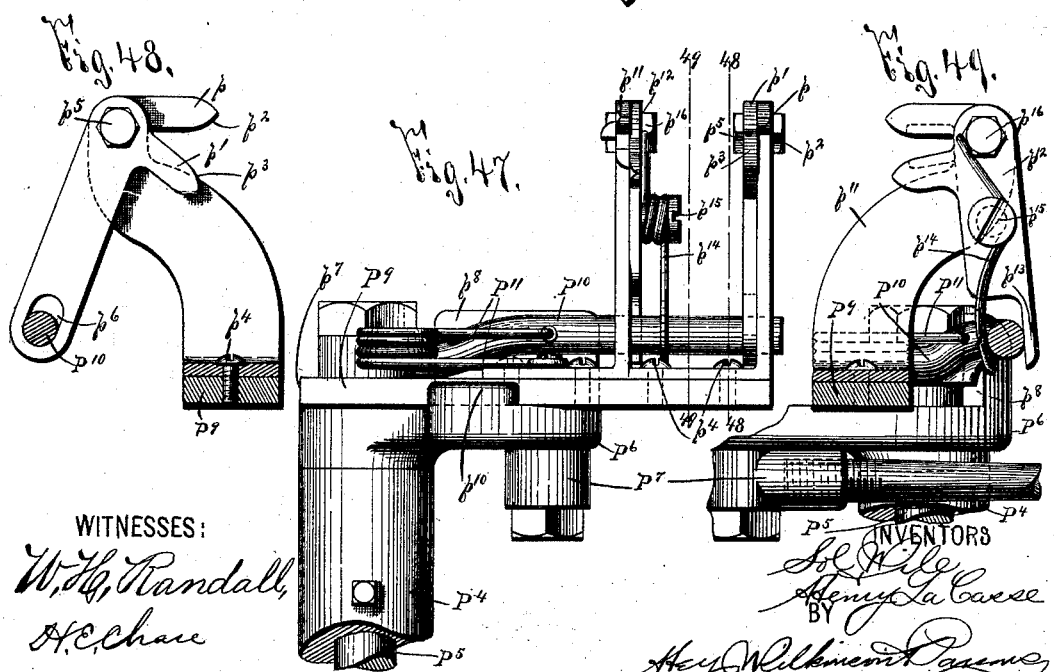
WITNESSES:
W. H. Randall,
H. E. Chase
INVENTORS
Sol Wile
Henry La Casse
BY
Hey J Wilkinson
ATTORNEYS.

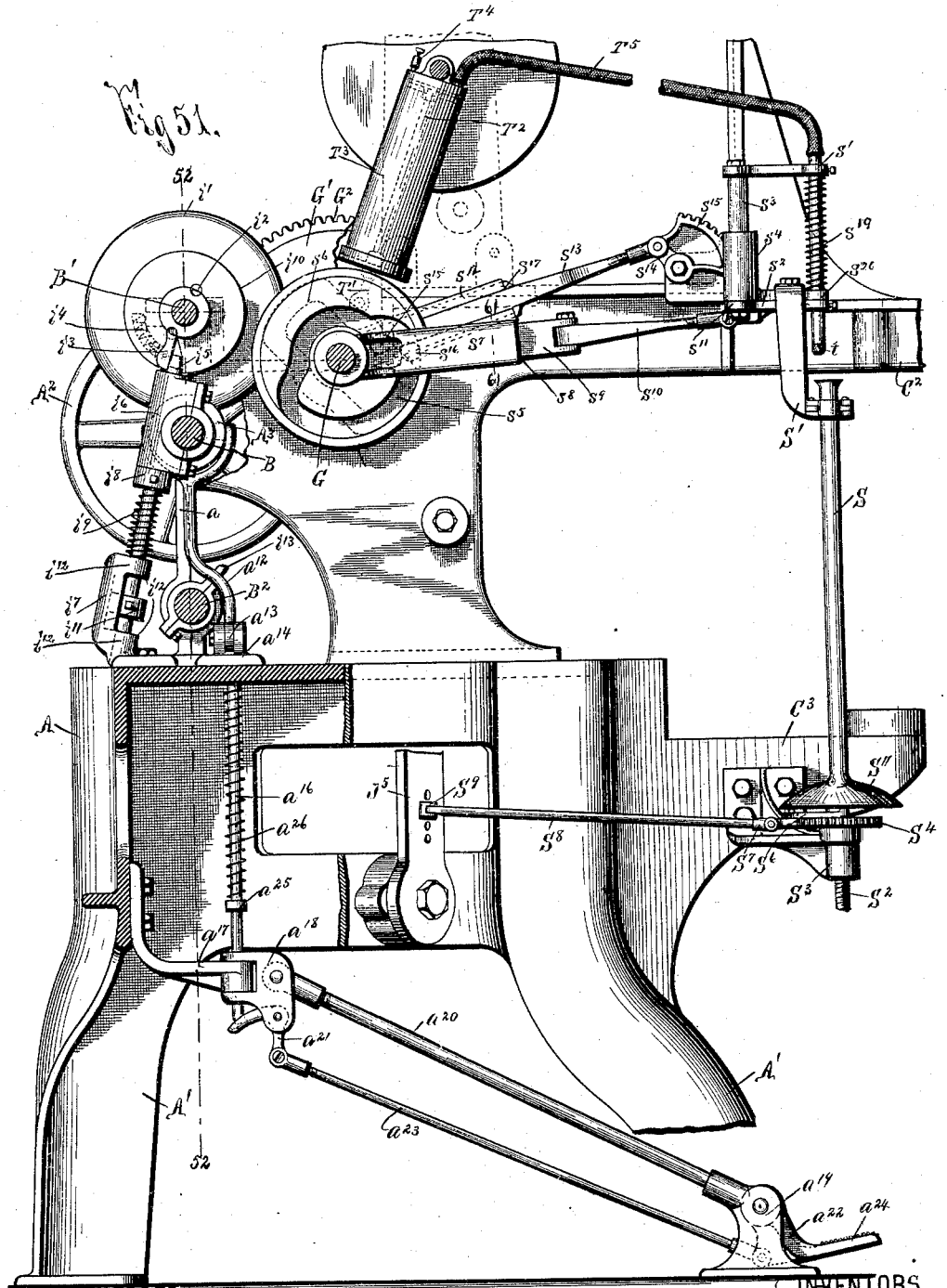

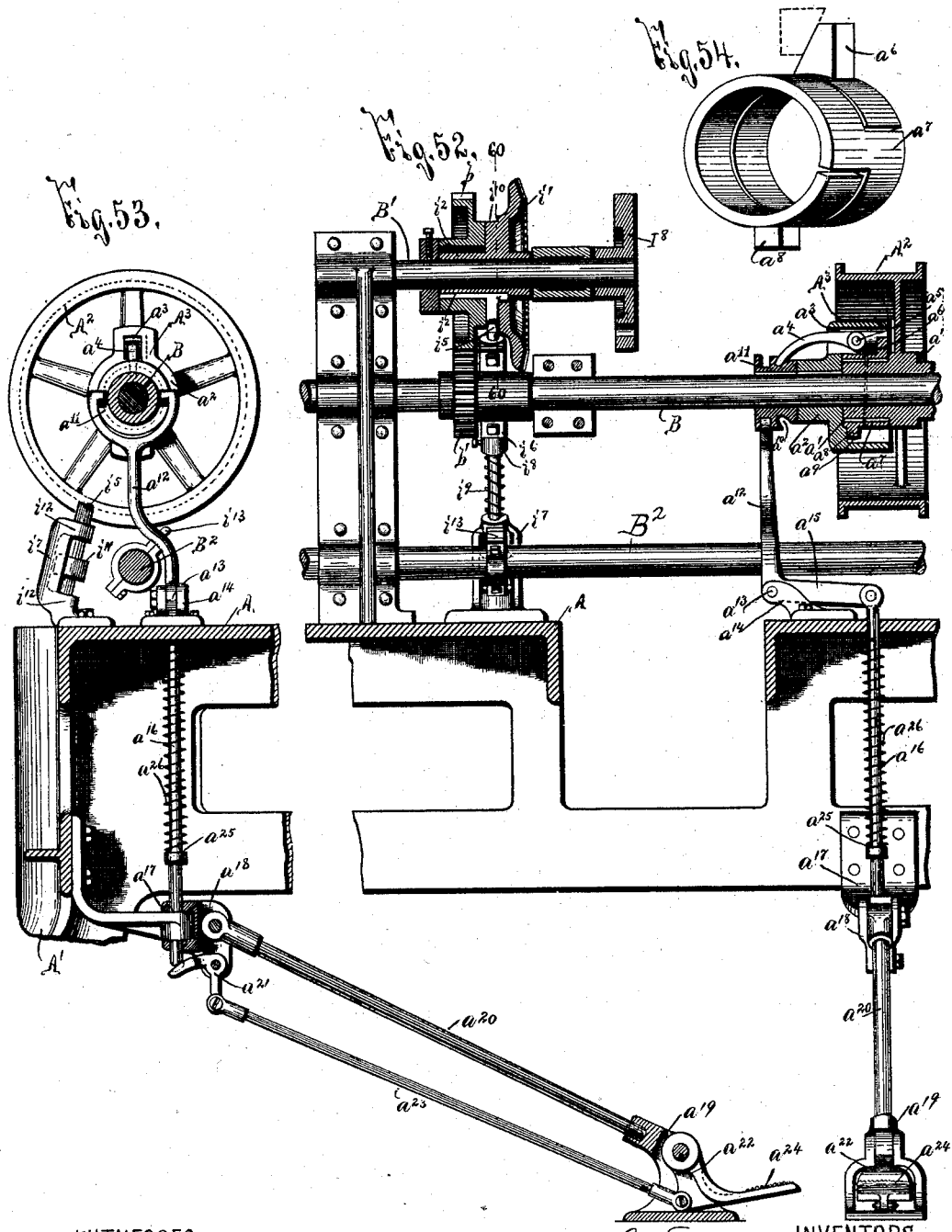

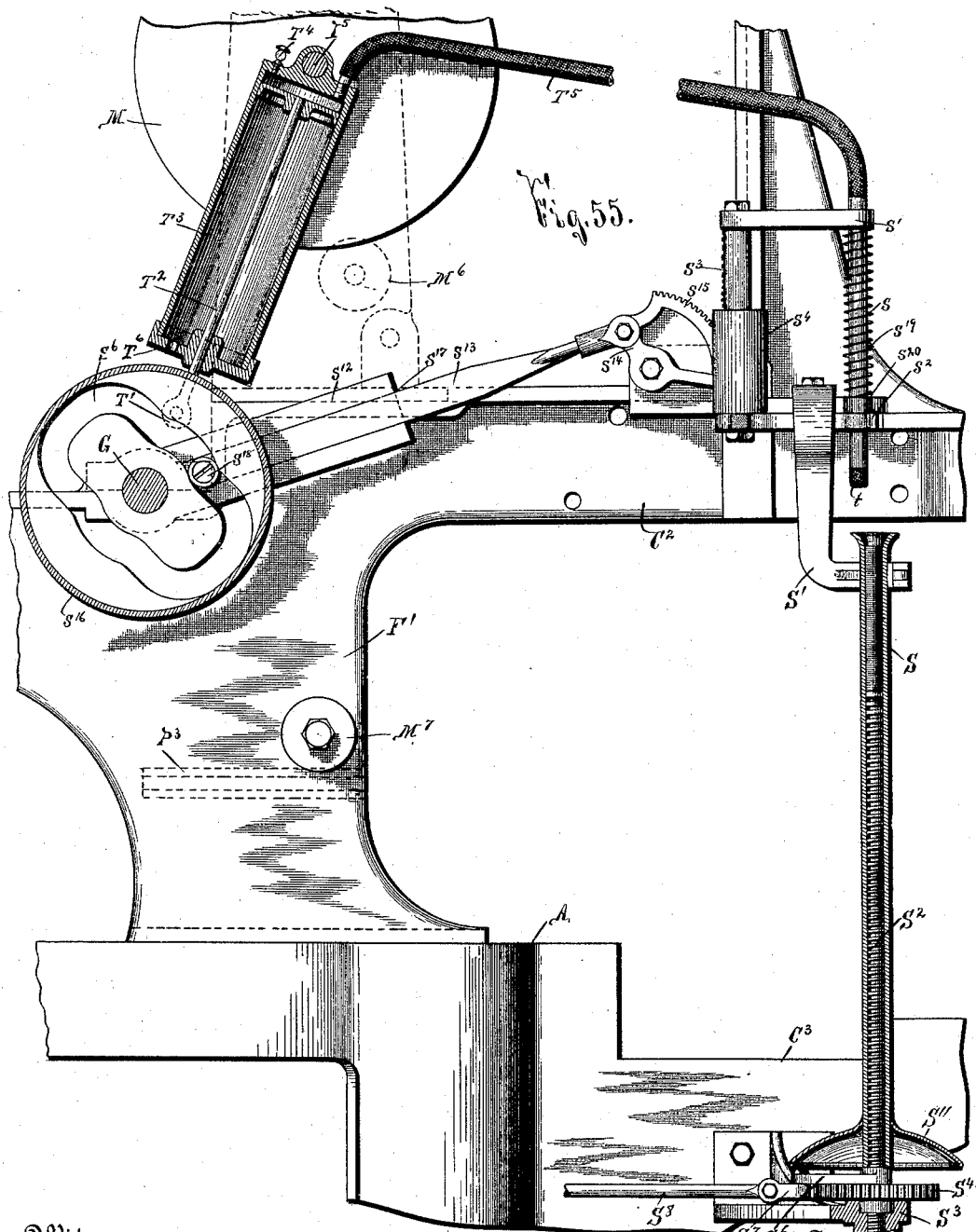

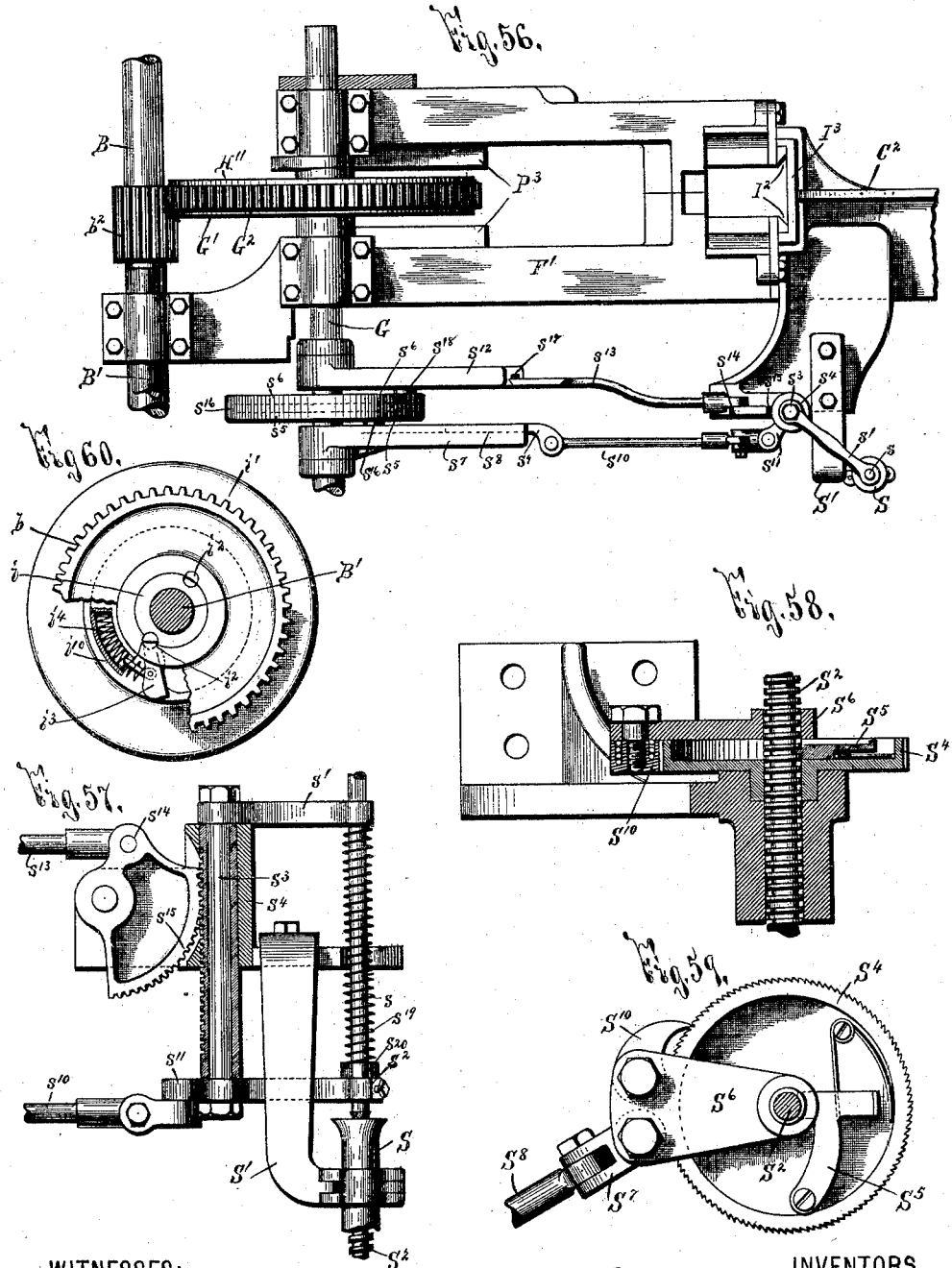

(No Model.) 32 Sheets—Sheet 30.
S. WILE & H. LA CASSE.
BOTTLING MACHINE.
No. 477,617. Patented June 21, 1892.
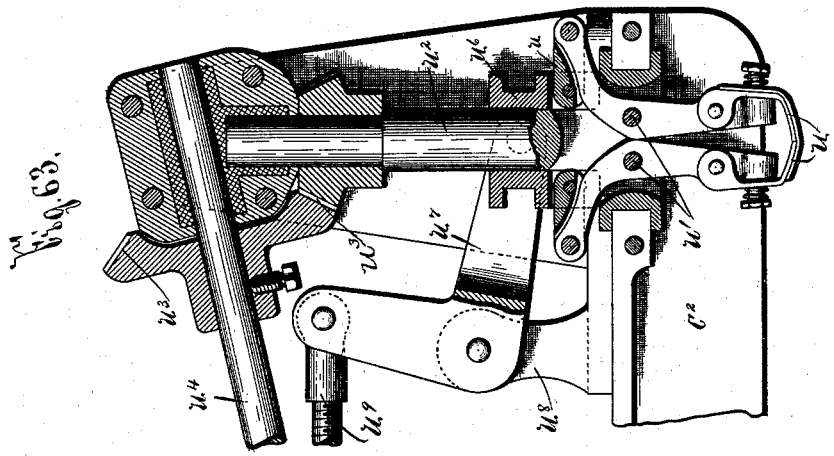
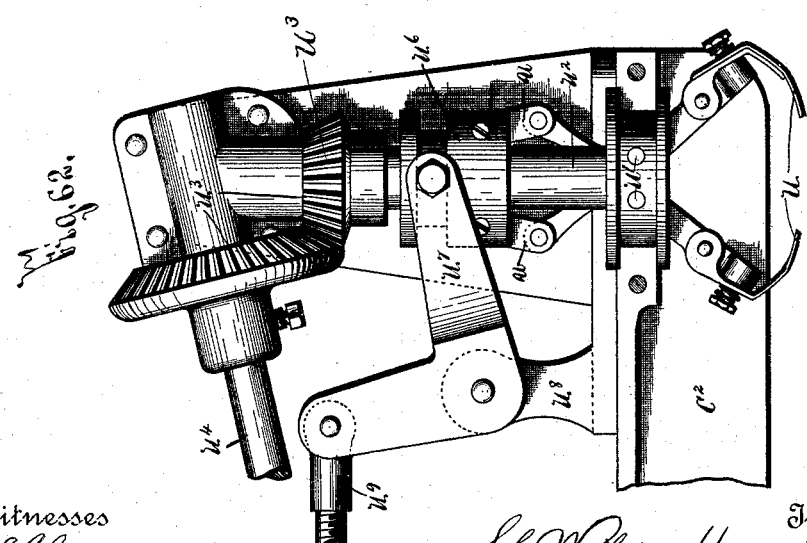

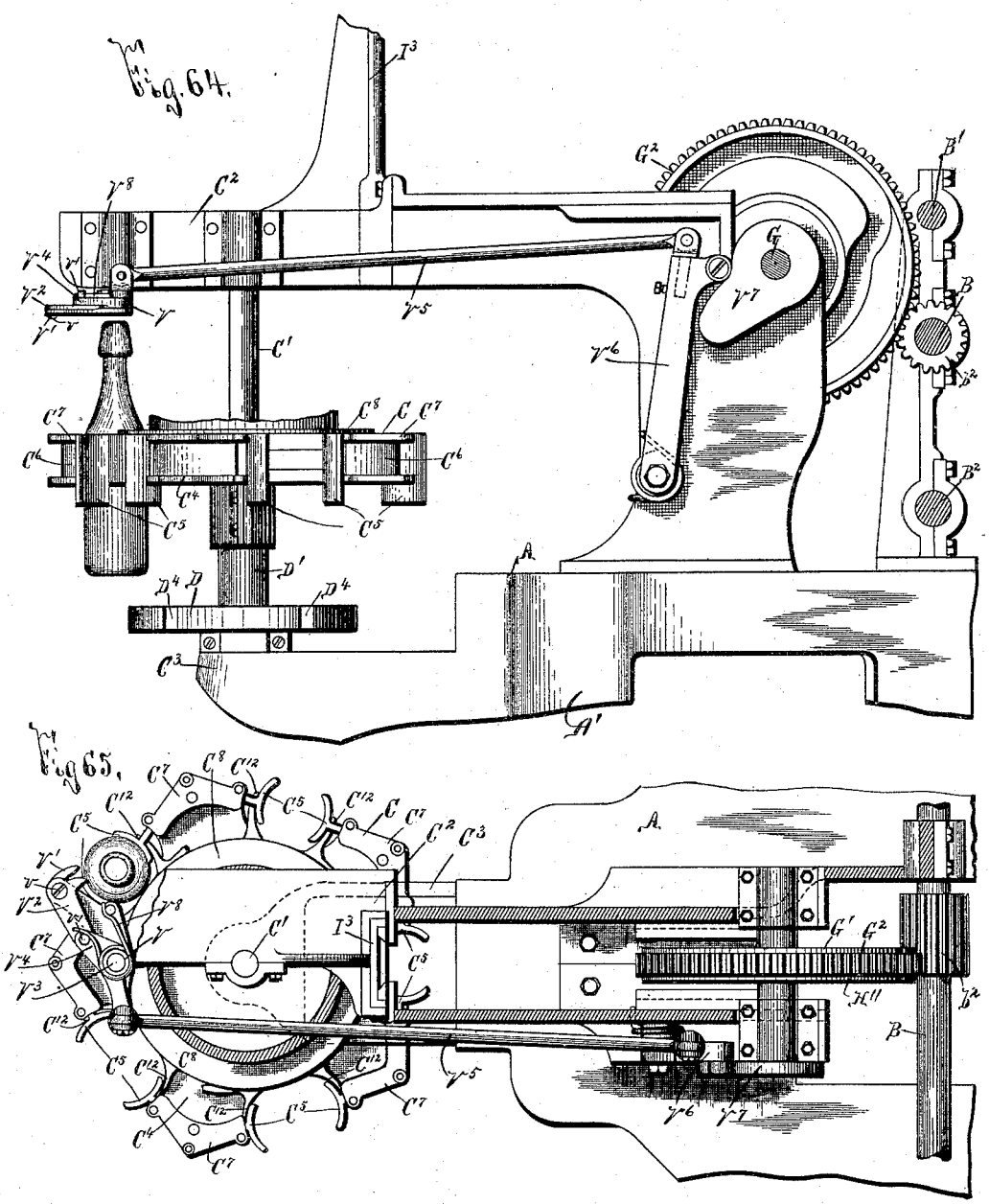

(No Model.) 32 Sheets—Sheet 32.
S. WILE & H. LA CASSE.
BOTTLING MACHINE.
No. 477,617. Patented June 21, 1892.
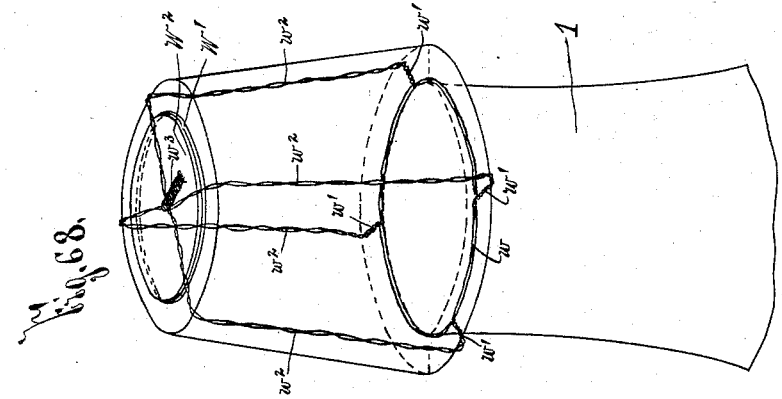
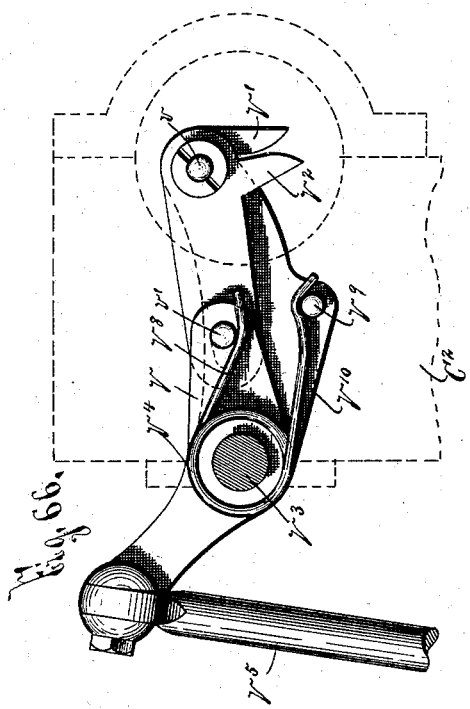
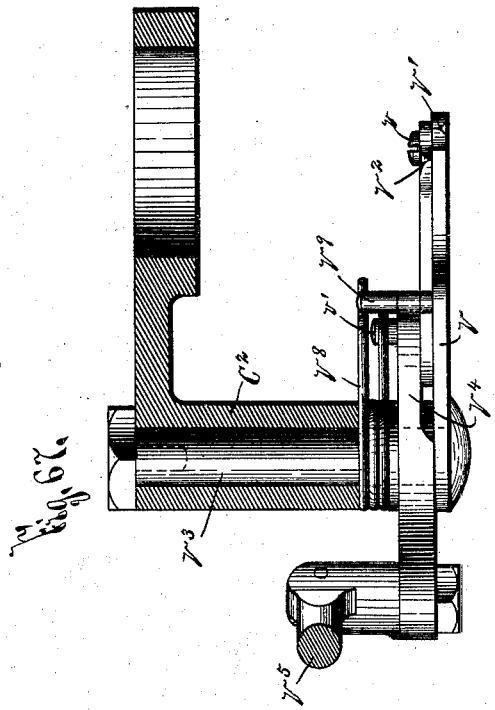
WITNESSES:
W. H. Randall,
H. E. Chase,
INVENTOR
Sol Wile
Henry La Casse
BY
Hay Wilkinson & Parsons
ATTORNEYS

UNITED STATES PATENT OFFICE.

SOL. WILE AND HENRY LA CASSE, OF ROCHESTER, NEW YORK, ASSIGNORS TO THE BOTTLERS' SPECIALTY COMPANY, OF SAME PLACE.

BOTTLING-MACHINE.

SPECIFICATION forming part of Letters Patent No. 477,617, dated June 21, 1892.

Application filed December 31, 1890. Serial No. 376,429. (No model.)

*To all whom it may concern:*

Be it known that we, SOL. WILE and HENRY LA CASSE, of Rochester, in the county of Monroe and State of New York, have invented new and useful Improvements in Bottling-Machines, of which the following, taken in connection with the accompanying drawings, is a full, clear, and exact description.

Our invention relates to improvements in bottling-machines of the same class as that shown in our pending application, Serial No. 375,735, filed December 24, 1890, and has for its object the production of a simple, effective, automatic, and rapidly-working machine for corking bottles and securing the corks thereto.

To this end it consists, essentially, in mechanism for placing a plate of tin or other suitable material upon the top of the bottle over the inserted cork and for securing the plate in said position by means of strands of wire secured to the bottle and passed over said plate and cork, whereby both are securely held.

The invention also consists in a feed, cut-off, compressor, and inserter for the corks and a feed or carrier gage and support for the bottles, operating conjointly with the plate-feed and the bottle-wiring mechanism.

The invention furthermore consists in the combination, with the plate-feeding mechanism, of the following separate wiring mechanisms to wit: for securing strands of wire to the bottle with their extremities projecting therefrom, for elevating their projecting extremities over the top of the bottle and said plate, and for twisting said extremities together in said position; and it still furthermore consists in the detail construction and arrangement of the parts, all as hereinafter more particularly described, and pointed out in the claims.

In describing this invention reference is had to the accompanying drawings, forming a part of this specification, in which like letters and figures indicate corresponding parts in all the views.

Figure 2:
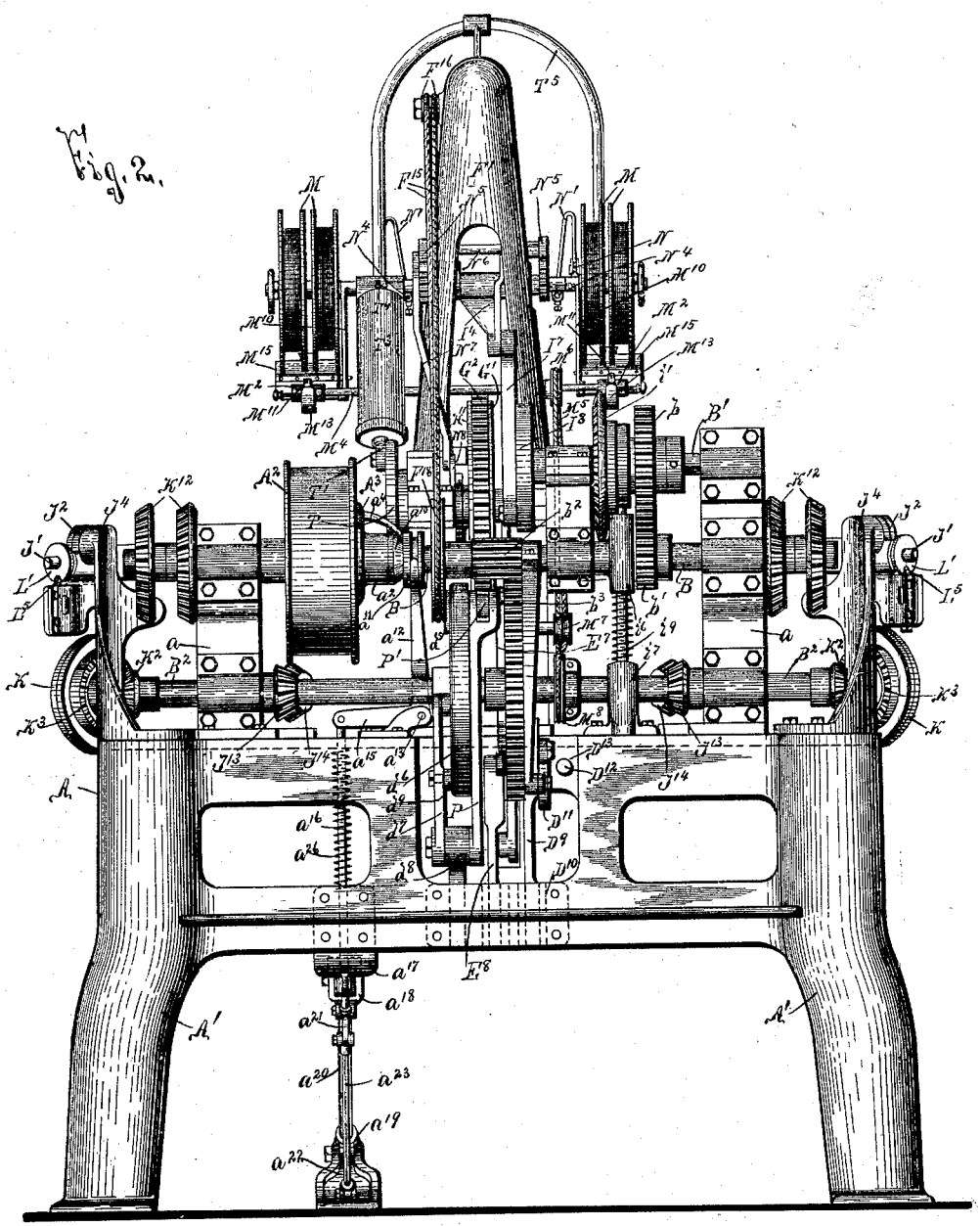
Figure 3:
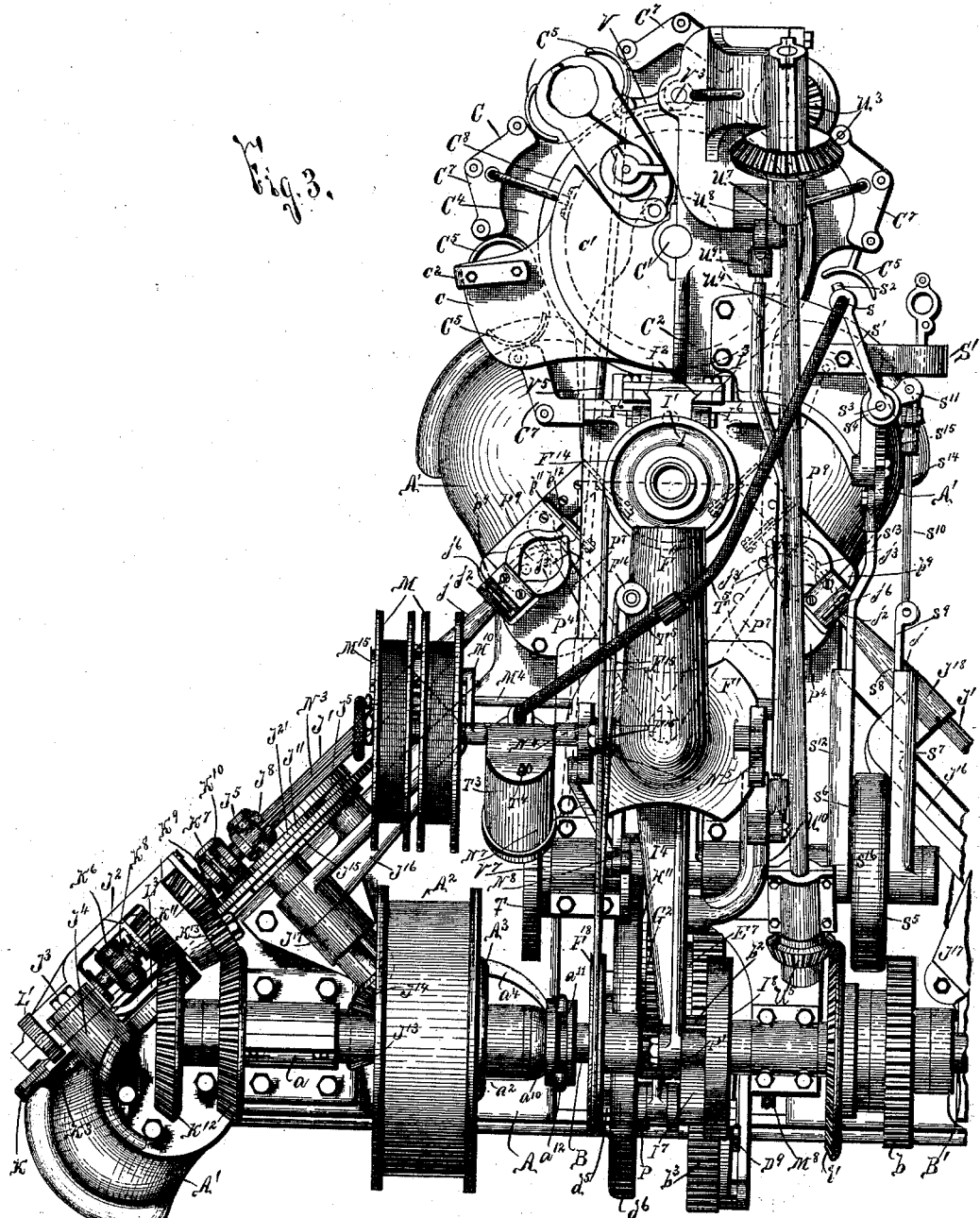
Figure 4:
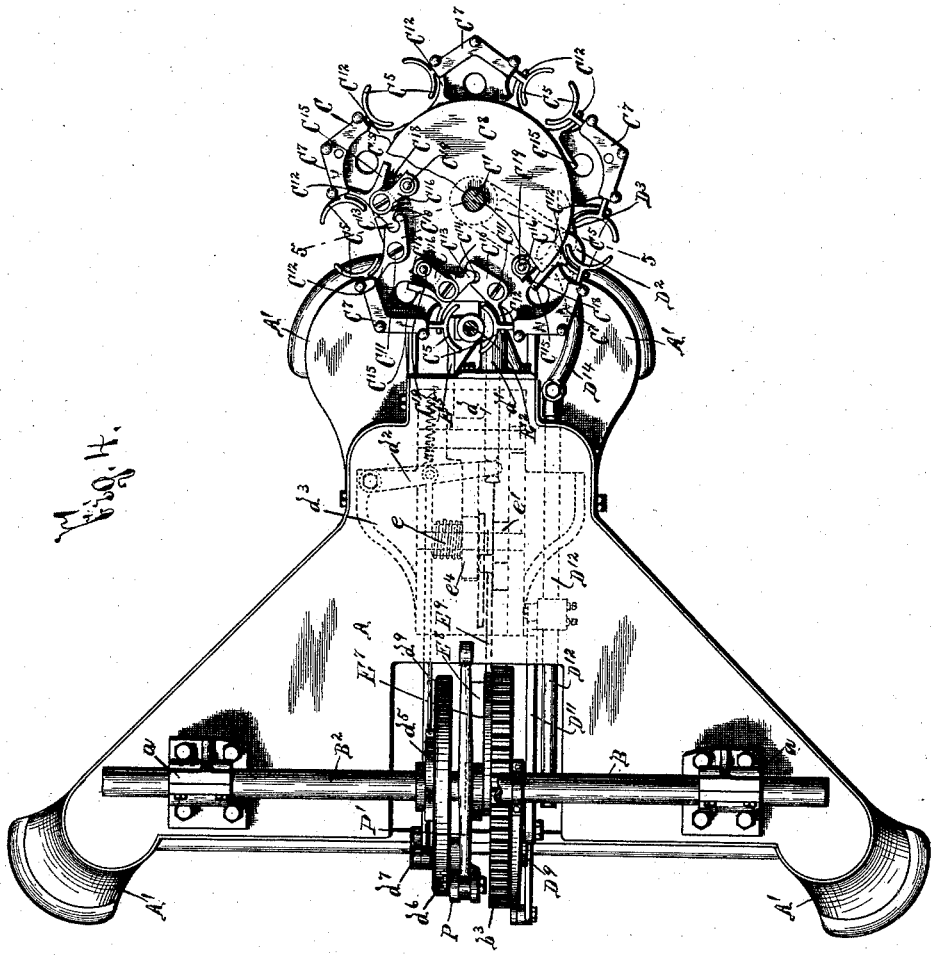
Figure 5:
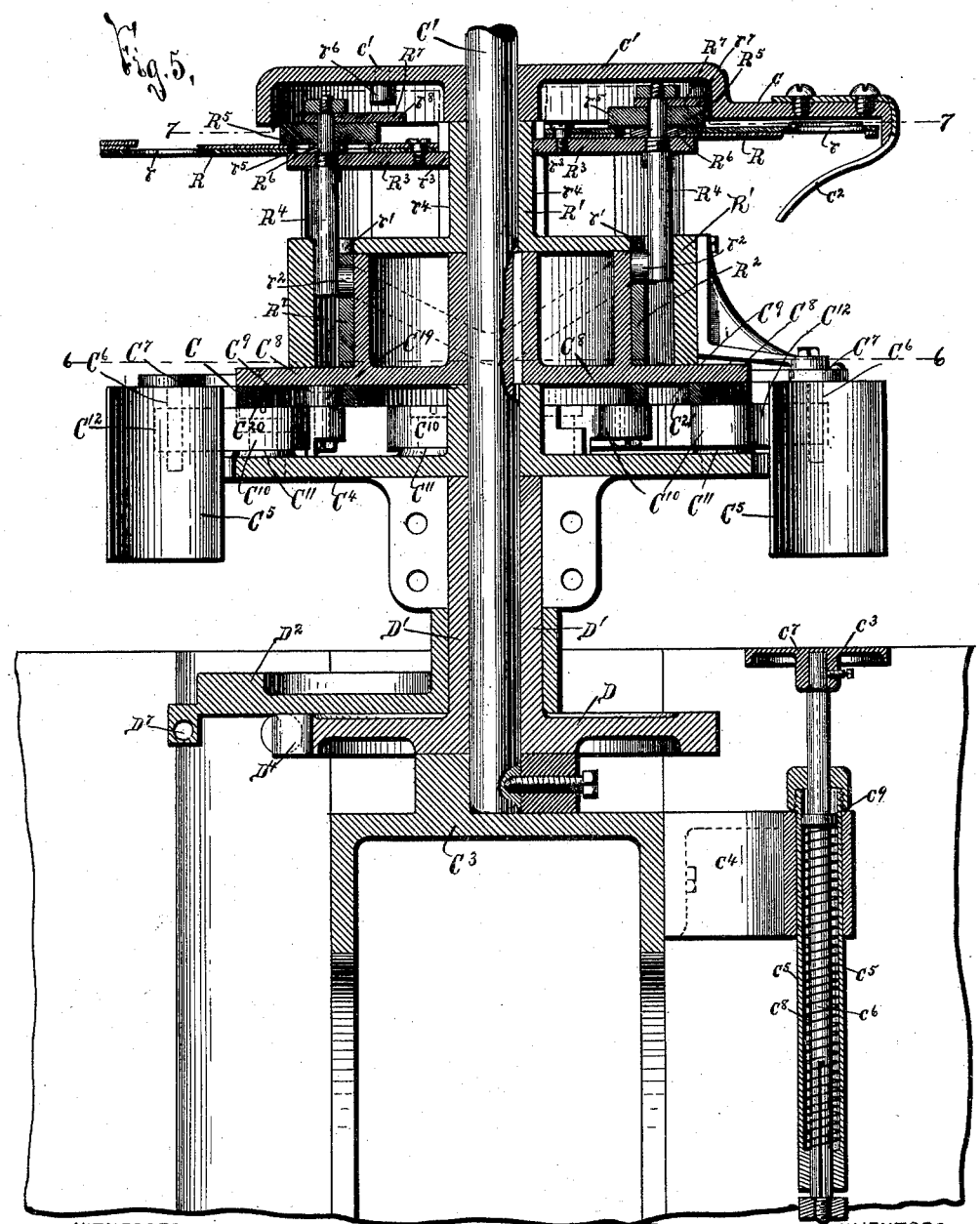
Figure 6:
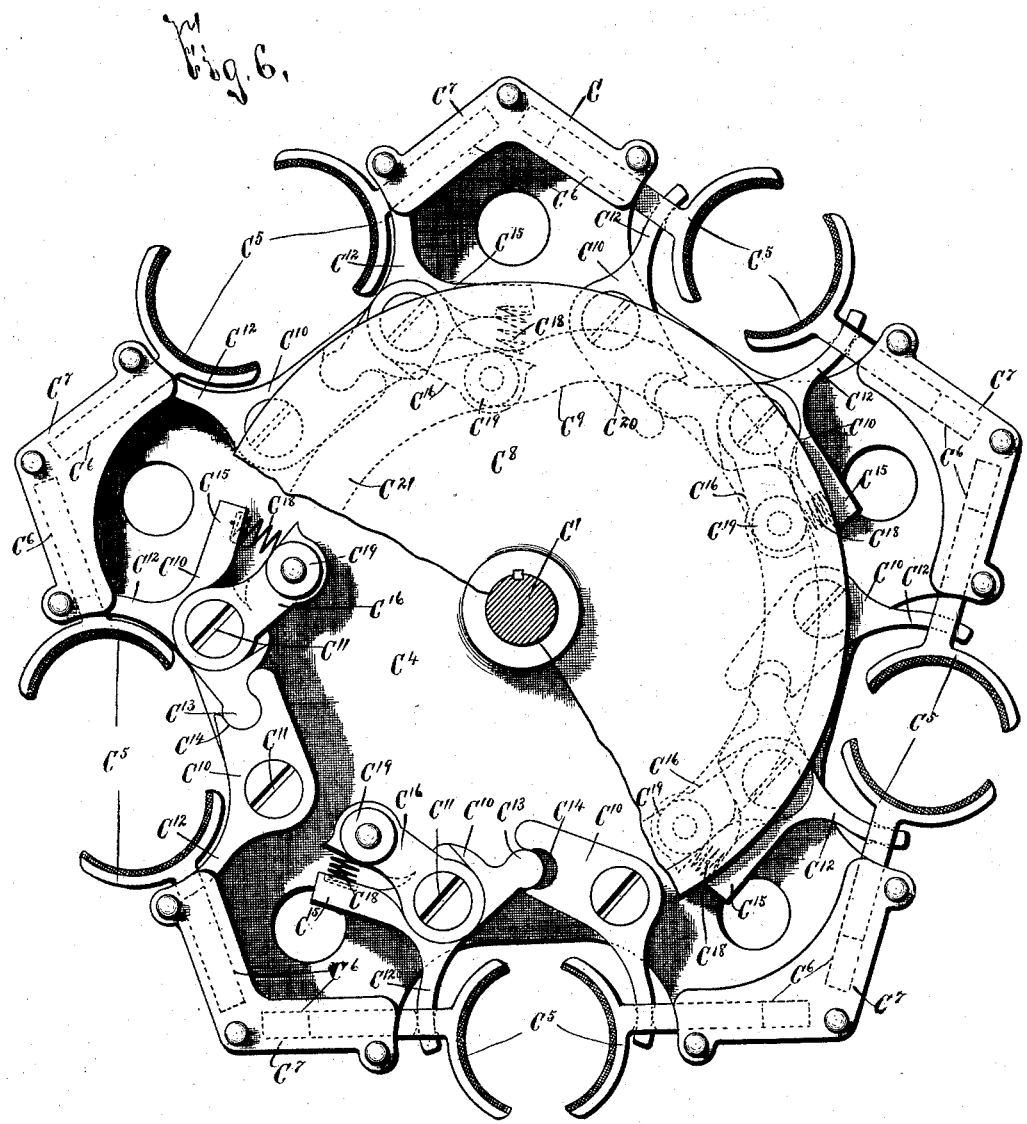
Figure 16:
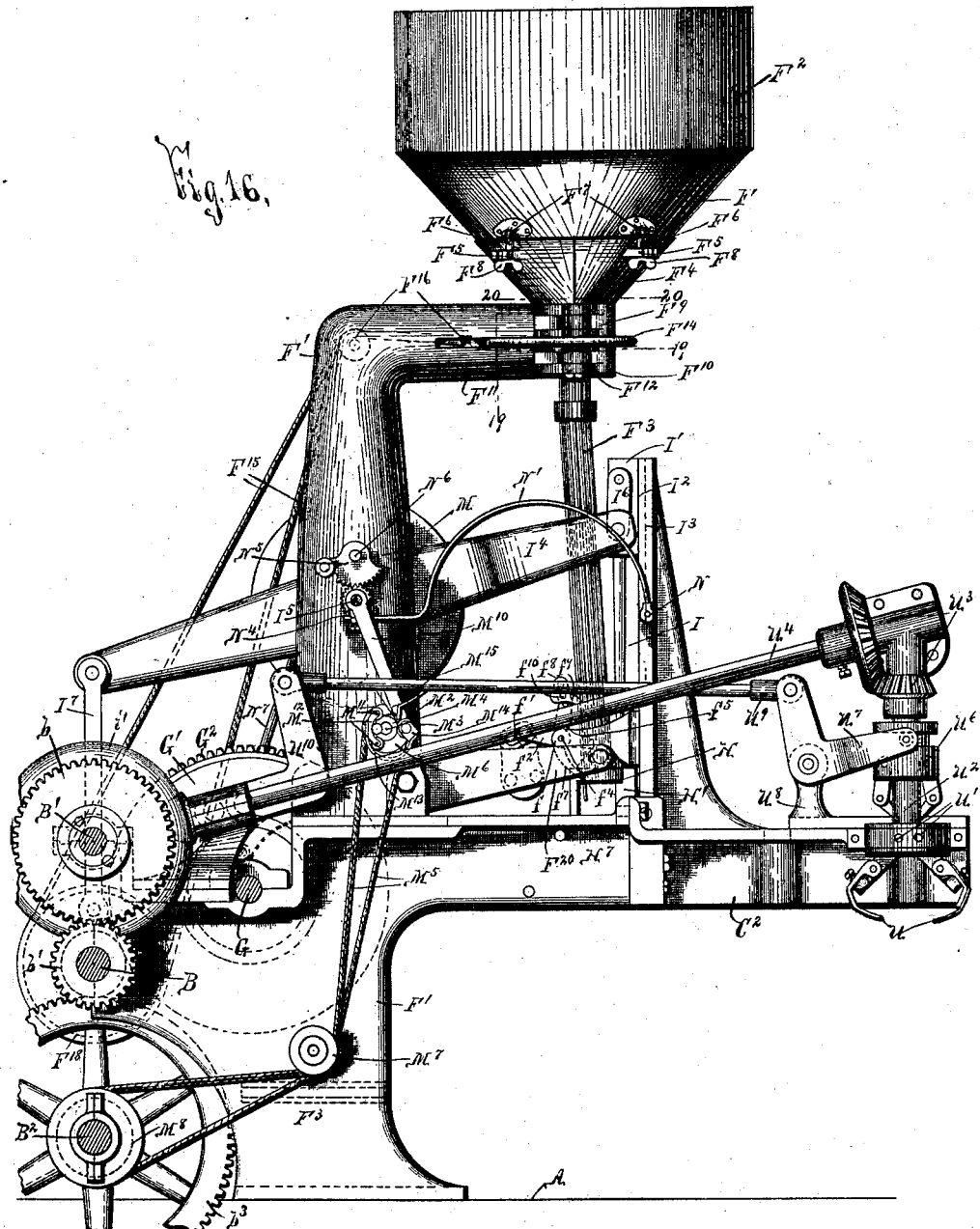
Figure 21:
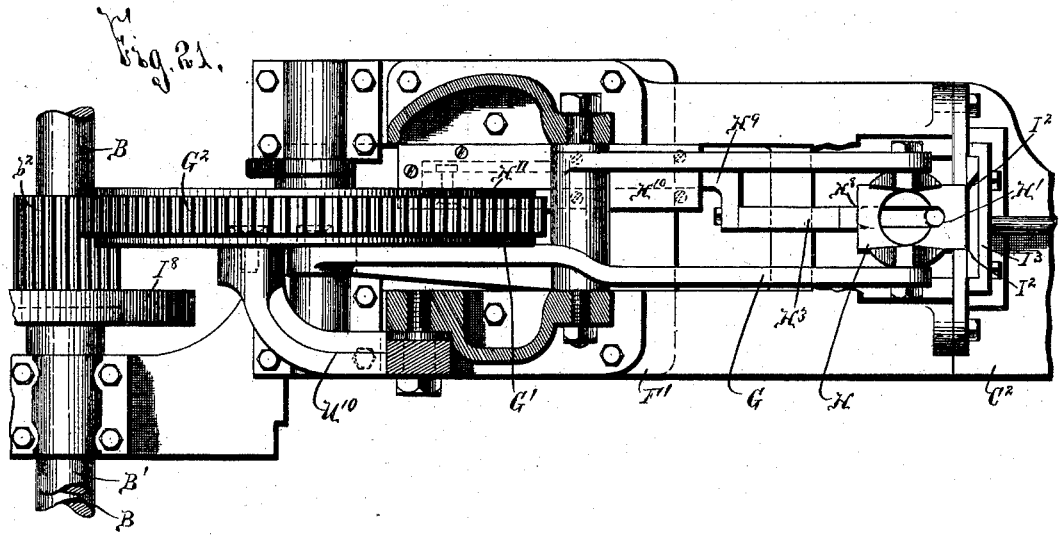
Figure 22:
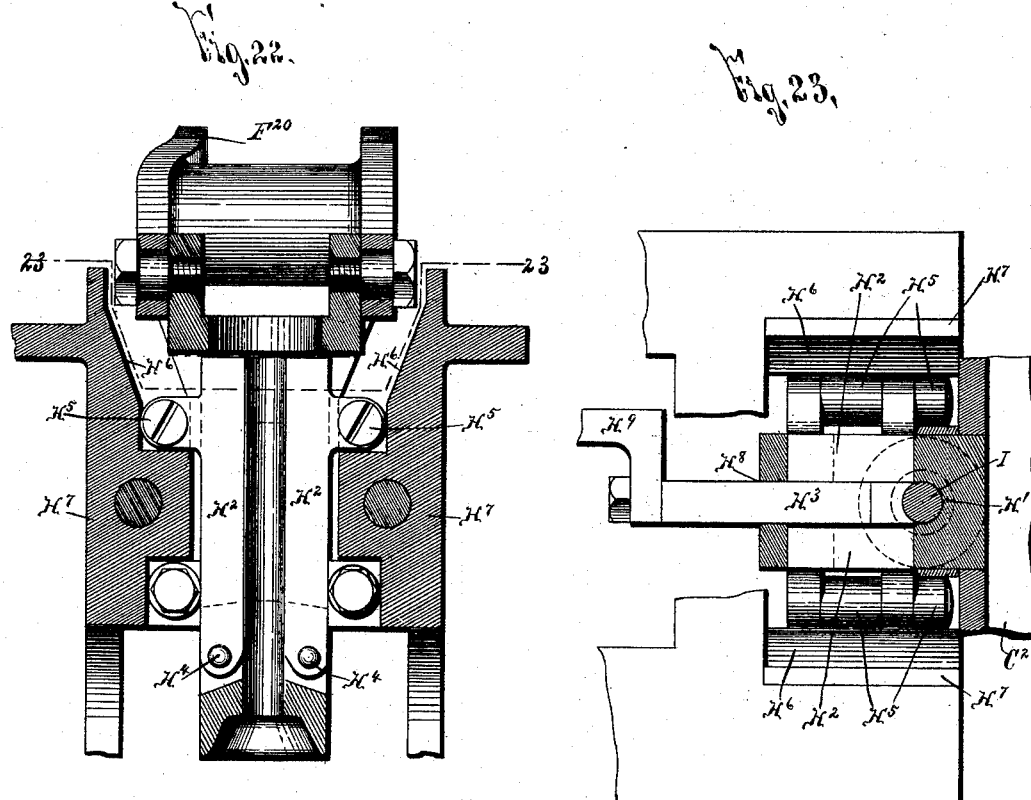
Figure 23:
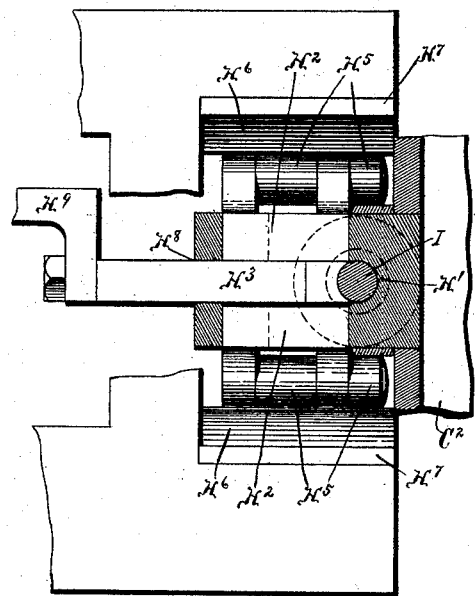
Figure 24:
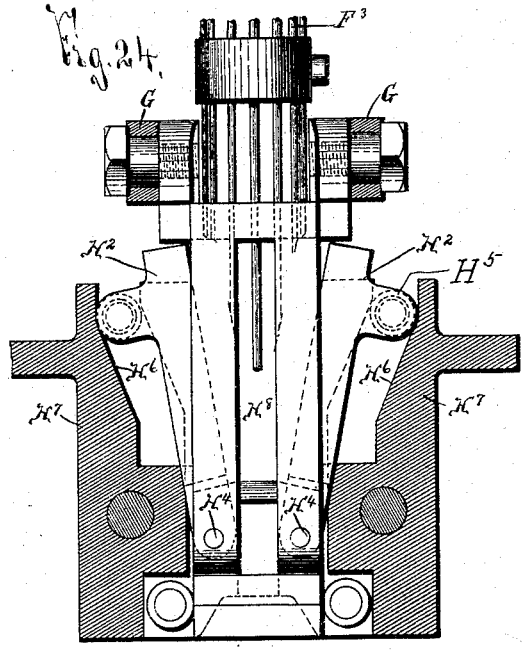
Figure 25:
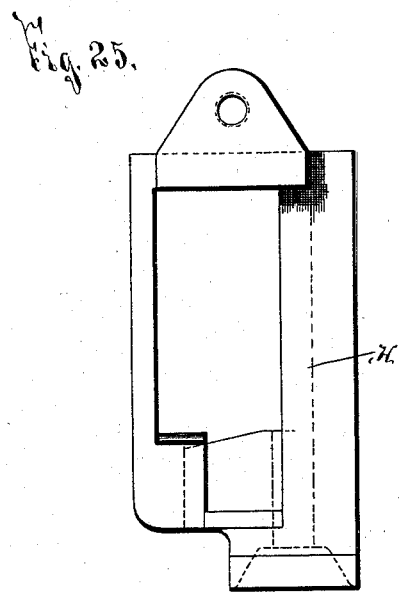
Figure 26:
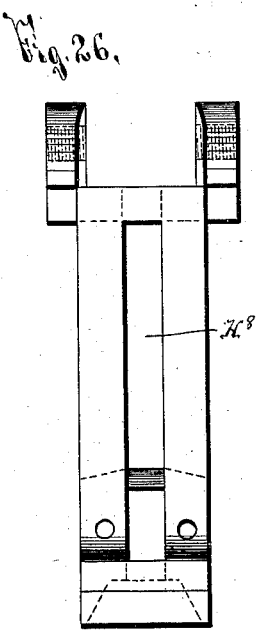
Figure 27:
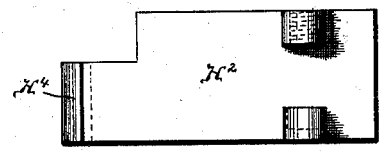
Figure 28:
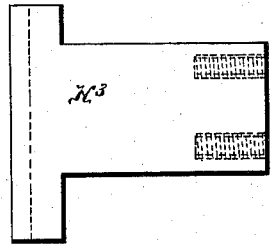
Figure 29:
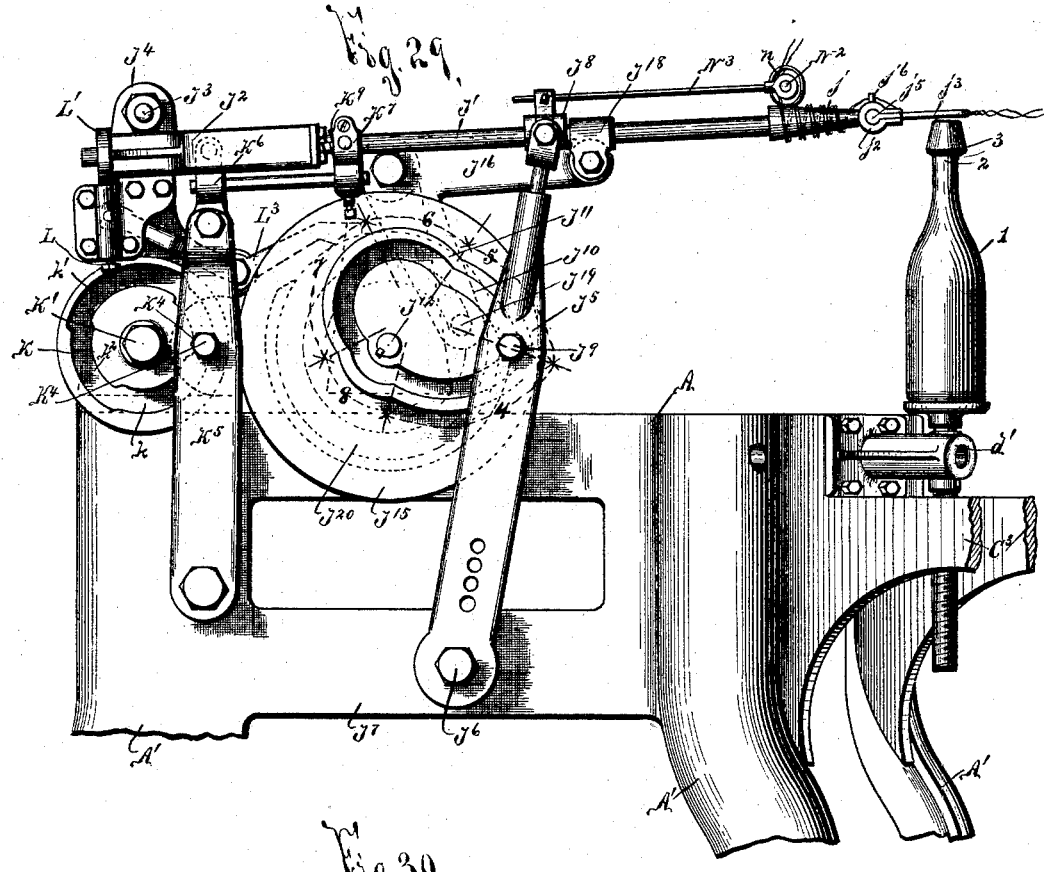
Figure 30:
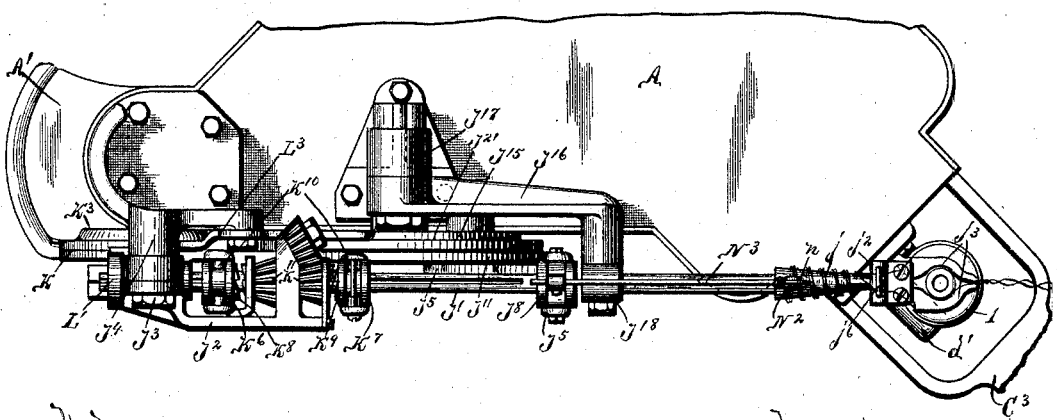
Figure 42:
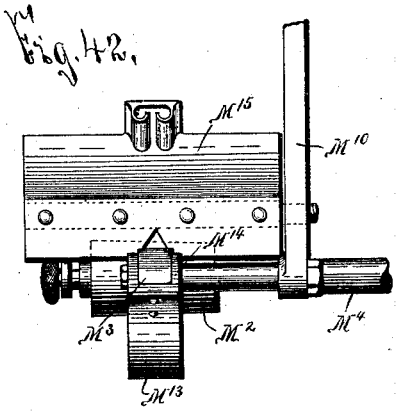
Figure 43:
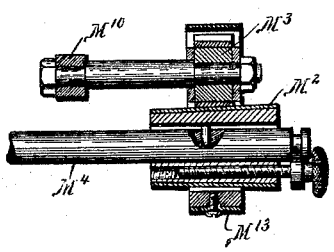
Figure 44:
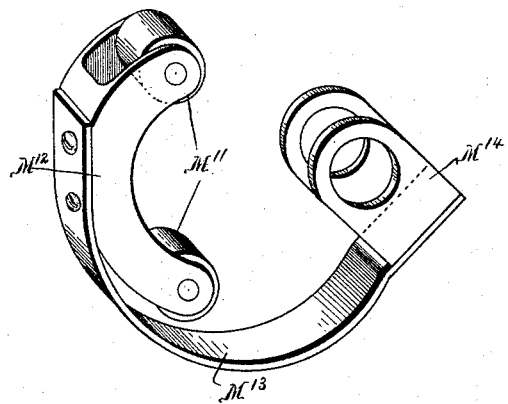
Figure 45:

Figure 1 represents a top plan view of our improved mechanism, illustrating the relative construction and arrangement of its component parts. Fig. 2 is a rear elevation of the parts as illustrated in Fig. 1 for further illustrating the relative arrangement and construction of such parts as are at the extreme rear of the machine. Fig. 3 is an enlarged plan view illustrating particularly the construction of the mechanism for feeding the bottles, for securing the wire thereto, and for feeding the tins to the bottles. Fig. 4 is a plan view of a detached bottle feed or carrier and its actuating mechanism, part of which is beneath the main frame and is shown by dotted lines. Fig. 5 is an enlarged vertical sectional view of the carrier, taken on line 5 5, Fig. 4, illustrating particularly the construction of the bottle-supporting arms and the lifting-jaws for elevating upward the projecting extremities of the wire secured to the bottle. Fig. 6 is an enlarged horizontal sectional view taken on line 6 6, Fig. 5, illustrating particularly the construction and operation of the feed-arms. Fig. 7 is an enlarged horizontal sectional view taken on line 7 7, Fig. 5, illustrating particularly the construction and operation of the wire-lifting jaws. Fig. 8 is an enlarged horizontal sectional view of the detached feed or carrier actuating mechanism, the parts being shown as in the position assumed when the feed is at rest. Fig. 9 is an elevation of the parts as illustrated in Fig. 8. Fig. 10 is an enlarged sectional view illustrating the construction and operation of the bottle-feed lock. Fig. 11 is an enlarged plan view of the lever and dog for rotating the bottle-feed. Fig. 12 is an enlarged sectional view of the mechanism for raising and lowering the bottle-support. Fig. 13 is a view similar to Fig. 12, illustrating the bottle-support in its raised position. Fig. 14 is an elevation of the opposite side of the mechanism shown in Fig. 13. Fig. 15 is a rear elevation of the bottle raising and lowering mechanism shown in Figs. 12, 13, and 14. Fig. 16 is an enlarged elevation of the cork feed, cut-off, compressor, and inserter, the mechanism for feeding the wire to the wire-shuttles, and the final twisting mechanism for the wire. Fig. 17 is a sectional view further illustrating the operation and construction of the cork cut-off, compressor, and inserter and the actuating mechanism for said parts. Fig. 18 is an enlarged vertical sectional view of the cork-feed and the cork cut-off or trip. Fig. 19 is a sectional view taken on line 19 19, Fig. 16, illustrating the removable clamp or support for the cork-hopper. Fig. 20 is a sectional view taken on line 20 20, Fig. 16, illustrating the construction of the lower extremity of the cork-feeding hopper. Fig. 21 is a horizontal sectional view of the compressor and its actuating mechanism. Fig. 22 is an enlarged vertical sectional view of the compressor shown in its closed position assumed when compressing the cork to the required size. Fig. 23 is a horizontal sectional view taken on line 23 23, Fig. 22, further illustrating the closed compressor. Fig. 24 is a similar vertical sectional view to Fig. 22, showing the compressor in its opened position. Fig. 25 is an elevation of the detached main compressor-jaw. Fig. 26 is an elevation taken at right angles to the plane of Fig. 25 for further illustrating the construction of said main compressor-jaw. Fig. 27 is an elevation of one of the side compressor-jaws. Fig. 28 is an elevation of the rear compressor-jaw. Fig. 29 is an enlarged elevation of one of the detached wire-shuttles and the actuating mechanism for moving it forward and backward, upward and downward, and locking it in a horizontal position. Fig. 30 is a top plan view of the parts as illustrated in Fig. 29. Fig. 31 is a similar view to Fig. 29, illustrating the wire-securing jaws as dropped beneath the neck of the bottle. Fig. 32 is a rear elevation of the parts as illustrated in Fig. 31. Fig. 33 is a similar view to Figs. 29 and 31, illustrating the shuttle as in its rearward position assumed after spinning out the required amount of wire. Fig. 34 illustrates in top plan view the parts as shown in Fig. 33. Fig. 35 is an enlarged elevation of the cams for actuating the shuttles. Fig. 36 is a plan view of the enlarged shuttle with one-half of its head broken away in order to illustrate the rear extremity of one of the jaws. Fig. 37 is an enlarged elevation illustrating the mechanism for feeding the wire to the wire-shuttles. Fig. 38 is a similar view to Fig. 37, illustrating the wire-carrying reel as removed and the shuttle as in its forward position. Fig. 39 is a horizontal sectional view illustrating the wire-carrying reels, the air-exhaust pump of the plate-feeding mechanism, the compressor, and its actuating-lever. Fig. 40 is a rear elevation of the parts as illustrated in Figs. 37 and 38, further illustrating their detail construction and arrangement. Fig. 41 is an end view of the rollers for feeding out the wire to the take-up of the wire-feeding mechanism. Fig. 42 is a front elevation of the parts shown in end view at Fig. 41. Fig. 43 is a horizontal sectional view taken on line 43 43, Fig. 41, illustrating the detail construction of the wire-feeding rollers. Fig. 44 is a perspective of a spring-guide for the wire. Fig. 45 is a front elevation of the detached extremity of the take-up lever. Fig. 46 is a top plan view of the detached mechanism for cutting off the wire after the desired amount has been spun off by the shuttle mechanism and for holding the wire during the completion of its twisting. Fig. 47 is an elevation illustrating one set of the wire cutting and holding jaws and their supporting-levers. Fig. 48 is a sectional view taken on lines 48 48, Fig. 47, showing the construction and operation of the cutting-jaws. Fig. 49 is a like sectional view taken on line 49 49, Fig. 47, fully illustrating the holding-jaws. Fig. 50 is a top plan view of the detached lever for actuating the levers carrying the cutting and holding jaws. Fig. 51 is an enlarged elevation of the plate-feed and the clutch mechanism for starting and stopping the operation of our improved bottling-machine. Fig. 52 is a vertical sectional view taken on line 52 52, Fig. 51, further illustrating the construction of said clutch mechanism. Fig. 53 is an end view of the parts as illustrated in Fig. 52. Fig. 54 is an isometric perspective of the spring member of the main clutch. Fig. 55 is an enlarged sectional view of the plate-feed, further illustrating its general construction and arrangement. Fig. 56 is a top plan view of the detached plate-feed. Fig. 57 is a sectional view of the mechanism for rocking and raising and lowering the take-up tube of the plate-feed. Fig. 58 is a detail sectional view of a portion of the plate-feeding tube and the levers for actuating the same. Fig. 59 is a top plan view of the parts as shown in Fig. 58. Fig. 60 is a sectional view taken on line 60 60, Fig. 52. Fig. 61 is a sectional view taken on line 61 61, Fig. 51. Figs. 62 and 63 are respectively an enlarged elevation and a vertical sectional view of the final twisting mechanism. Figs. 64 and 65 are respectively an enlarged elevation and a plan of the final cutting mechanism and a detached portion of the carrier. Fig. 66 is a top plan view of the detached final cutting-jaws. Fig. 67 is an elevation, partly in section, of the parts shown in Fig. 66; and Fig. 68 is a perspective of a bottle-neck corked, capped, and wired by our bottling-machine.

In bottling-machines as heretofore produced great difficulty is experienced in wiring the cork to the bottle automatically and rapidly, in order that a single machine may have a great capacity and operate automatically with a minimum amount of attendance. It is also at present impractical to so wire the cork to the bottle that the manufacturer's name or the particular brand of the liquid may be stamped above the cork without materially lessening the capacity and efficiency of the machine. A serious objection to the use of this class of machines which hold the cork by strands of wire secured to the bottle and passed above the cork is that when steamed or heated the pressure generated within the bottle invariably causes the upper extremity of the cork to become greatly cut by the wire, and in some cases forces the cork from the bottle.

In our previous patent, No. 443,185, we have shown a bottling-machine in which the escapement of the cork is reduced to a minimum; but, as just stated, the upper end of the cork is frequently severely cut up, and it is impossible to neatly and presentably attach to the top of the bottle a representation of either the manufacturer's name or the name or grade of the contained liquid.

Our present machine is designed to operate very rapidly and automatically and to obviate the difficulties and objections heretofore present in bottling-machines of this class.

A represents the table, which is of suitable size, form, and material and is supported upon suitable legs or standards A'. Suitably supported by either the table A or the standards A' are the various elements or distinct mechanisms of our invention—viz., a bottle feed or carrier, a bottle-support, a cork-feed, a compressor, a cork-inserter, wire-feeding mechanism, wire securing and twisting mechanism, cutters and holders, plate-feed, wire-lifters, final twisting mechanism, and final cutters.

B is the motor-shaft, supported in suitable brackets $a$, mounted on the table A. Power may be communicated to this motor-shaft by any suitable construction of pulleys; but we have here shown upon the shaft a loose pulley $A^2$, which may be locked to the shaft by a clutch $A^3$. (Best seen at Figs. 51, 52, 53, and 54.) One side of the hub $a'$ of the pulley $A^2$ is encircled by the clutch-section $a^2$, which at one extremity is suitably locked to the shaft B and at the other is provided with an annular flange encircling said side of the hub $a'$. Supported in a slot $a^3$ of the clutch-section $a^2$ is a dog $a^4$, the inner extremity of which is pivoted at $a^5$, and, as shown in dotted lines at Fig. 54, is adapted to engage with its free beveled extremity a beveled shoulder $a^6$, formed upon a spirally-bent spring friction-ring $a^7$. (Best seen at Fig. 54.) The opposite extremity $a^8$ of the ring $a^7$ is secured in a slot $a^9$, oppositely arranged with the slot $a^3$. The forward extremity of the dog $a^4$ extends beyond the clutch-section $a^2$ and rotates in an annular groove $a^{10}$, formed in a clutch-section $a^{11}$, which is movable on the main shaft by means of one arm of a lever $a^{12}$, pivoted at $a^{13}$ to a bracket $a^{14}$ upon the main frame. The opposite arm $a^{15}$ of the lever is pivoted to a connection $a^{16}$, which is movable up and down in a bracket $a^{17}$, secured to one of the standards A'.

$a^{18}$ is an arm or ear supported on the hub of the bracket $a^{17}$, and $a^{19}$ is a bracket connected to the former bracket by a rod $a^{20}$.

Pivoted to the brackets $a^{18}$ and $a^{19}$ are bell-cranks $a^{21}$ and $a^{22}$, respectively having their adjacent arms connected together by the rod $a^{23}$. The free arm of the bell-crank $a^{21}$ bears on the lower extremity of the rod $a^{16}$, and the free arm of the bell-crank $a^{22}$ is provided with a foot-engaging portion or pedal $a^{24}$. When this pedal $a^{24}$ is forced downward, the connection $a^{16}$ is forced upward and the sliding section $a^{11}$ rocked outward, whereupon the free end of the dog $a^4$ is elevated and its rear end tensions the friction engaging-ring $a^7$, securely locks the clutch-section $a^2$ to the hub of the pulley $A^2$, and thus rotates the shaft B and sets in motion the various parts of the machine.

$a^{25}$ represents a shoulder on the rod $a^{16}$, between which and the adjacent face of the table A is interposed a spring $a^{26}$, which forces the rod downward and automatically releases the pulley $A^2$ when pressure is removed from the pedal $a^{24}$.

Above the main shaft B is the shaft B', which actuates the cork-inserter I and the final twisting mechanism, and below said main shaft is the shaft $B^2$, which actuates the bottle-support and the mechanisms for securing strands of wire to the bottle with their extremities projecting and for twisting together the projecting extremities. Motion is communicated to the upper shaft B' by means of the gears $b$ and $b'$, mounted on the shafts B' and B, respectively, and the lower shaft $B^2$ is driven by means of gears $b^2$ and $b^3$ on the respective shafts B and $B^2$.

C represents the bottle feed or carrier, which is of desirable form, size, and construction to feed the required number of bottles 1 and enable the various other mechanisms of our improved machine to perform their functions in the desired order as effected by the connected mechanism between them.

We have here illustrated and will immediately proceed to describe that form of carrier most applicable for the desired purpose.

C' represents a stationary cylindrical rod, which, as best seen in Figs. 1, 3, 4, 5, 64, and 65, is supported in outwardly-extending arms of suitable brackets $C^2$ and $C^3$, the former being mounted upon the table A and the latter projecting from one of the legs A'. Journaled upon this rod C' is the disk $C^4$, upon which are supported the bottle-grasping arms $C^5$, having their adjacent faces concaved and preferably provided with rubber or other yielding faces for tightly grasping the bottle and their extremities movable in guides $C^6$, formed in an upturned flange $C^7$ at the edge of the disk $C^4$. As preferably constructed the guides for each pair of arms are in the same lengthwise plane in order that the arms may move toward a common center and thus always support the bottles at the same point irrespective of their size. Above the arm-holding disk $C^4$ is the cam $C^8$, which is provided with a camway $C^9$ for opening and closing the jaws.

$C^{10}$ represents a lever pivoted at $C^{11}$ to the disk $C^4$. This lever is formed with three arms, one of which $C^{12}$ engages a slot in the forward extremity of the adjacent arm $C^5$. A second arm is formed with a rounding end $C^{13}$, adapted to engage a socket $C^{14}$ in the adjacent extremity of the opposite lever. The third arm $C^{15}$ is extended rearwardly from the arms $C^{12}$ and $C^{13}$, and interposed between the extremity of said latter arm and a lever $C^{16}$, which is also pivoted at $C^{11}$, is a spring $C^{18}$, that tends constantly to force the jaws $C^5$ into their open position.

Provided upon the free extremity of the lever $C^{16}$ is a roller or stud $C^{19}$, which rides in the camway $C^9$, and when, as best seen in Fig. 6, the cam-tooth $C^{20}$ is registered with said roller the lever $C^{16}$ is forced against the lever $C^{15}$ and by means of the compressed spring $C^{18}$ rocks the lever $C^{10}$ on its pivot, thus closing the arms $C^5$ upon the bottle. On the other hand, when the depression $C^{21}$ is registered with the roller $C^{19}$ the bottle-supporting arms are opened for the purpose of releasing the bottle or inserting a new one. Should the diameter of the bottle be a little larger than the gage for which the parts are preferably adjusted, the spring $C^{18}$ becomes a little more compressed than usual, thus allowing the jaws to adapt themselves without breaking the bottle. It will be noted that only one of the levers $C^{10}$ of each pair is provided with three arms, as motion is preferably communicated to both levers by means of only one connection $C^{16}$, since both levers are locked together at their adjacent extremities and a movement of one produces a movement of the other. This bottle-feed is particularly applicable in our improved machine; but it is evident that its construction may be greatly changed without necessarily impairing its capability of feeding the bottles to the various other mechanisms of our improved machine.

$c$, Fig. 5, represents a gage with which the tops of the bottles are brought in contact when inserting the bottles into the feed. This gage may be of desirable form and construction, but preferably consists of an arm formed upon a disk $c'$, rigidly secured to the rod $C'$. Depending from this gage at its rear and inner sides is a guard $c^2$ for aiding the operator in supporting the bottle in the desired position. Beneath the gage $c$ is the yielding bottle-support $c^3$, which forces the bottles firmly against the gage and brings the top or nose of each to the same plane, in order that the parts of the mechanism may effect a very perfect operation, as would be impossible if the tops of the bottles were in different planes.

$c^4$ represents a bracket secured to the arm $C^3$ for supporting the bottle-supporting rod $C'$. Mounted upon this bracket $c^4$ is a tube $c^5$, within which is the spring-actuated rod $c^6$. At the upper extremity of this rod is the top or contact-plate $c^7$, and around the rod $c^6$ is a spring $c^8$, which constantly forces said plate upward until a collar $c^9$ prevents its further movement.

After the bottle is placed in the desired position in the feed the mechanism (best seen in Figs. 1, 3, 4, 8, 9, 10, and 11) actuates the arm-supporting disk $C^4$ around the supporting-rod $C'$ to feed the bottles to the various mechanisms of our machine and momentarily holds said disk stationary to afford time for the performance of the respective operations, as will be hereinafter set forth.

D represents a disk loosely mounted on the rod $C'$ and formed with an upwardly-extending hub $D'$, to which is suitably secured the downwardly-extending hub of the arm-supporting disk $C^4$. Above the disk D, as best seen in Figs. 8 and 9, is an arm $D^2$, having one extremity loosely mounted on the hub $D'$ and the other provided with a dog $D^3$, that engages notches $D^4$, formed in the periphery of the disk D. This dog is constantly forced into engagement with said notches $D^4$ by a spring $D^5$, Fig. 11, interposed between shoulders $D^6$ and $D^7$, formed, respectively, on the dog $D^3$ and the arm $D^2$. Motion is communicated to the lever $D^2$ by a cam $D^8$ upon the lower shaft $B^2$. This cam preferably consists of a roller upon the gear $b^3$ and is adapted to contact with the upper extremity of a lever $D^9$, having its lower extremity pivoted to a bracket $D^{10}$ and tensioned by a spring $D^{15}$. Pivoted to the lever $D^9$ is a connection $D^{11}$, that is rigidly secured to a sliding rod $D^{12}$, movable in ways $D^{13}$, formed beneath the top face of the frame A, with its forward extremity of this connection $D^{12}$ loosely connected to the lever or arm $D^2$ by a link $D^{14}$. As the roller $D^8$ contacts with the lever $D^9$ the connections $D^{11}$ and $D^{12}$ and $D^{14}$ rock the lever $D^2$ forward and partially rotate the disk D, thus carrying the bottle from the compressor, cork-inserter, and wire-applying mechanism to the tin-feed, and thence to the final twisting mechanism and final cutters, as will be presently set forth. The lever $D^2$ is then retracted by the cam $D^8$, that in its further rotation contacts with a lever $D^{16}$, having one extremity pivoted to the shaft B and the other connected by a link $D^{17}$, to the lever $D^9$, whereby the backward movement of said lever $D^{17}$ retracts the lever $D^9$, whose return movement is accelerated by the spring $D^{15}$. The carrier-lock $d$ preferably consists of a rod sliding in the forward face of the frame and a bracket $d'$, secured thereto and having its forward extremity adapted to enter the notches $D^4$ and lock the bottle-feed from further movement until said rod is withdrawn.

$d^2$ represents a lever having one end pivoted to a box-shaped bracket $d^3$, mounted beneath the table A, and the other end engaged with the rear extremity of the rod $d$ for forcing the same forward and backward.

$d^4$ represents a spring having its opposite extremities attached to said lever $d^2$ and the forward face of the table A in order to normally force the locking-rod $d$ against the periphery of the disk D, whereupon it readily enters the notches $D^4$ upon registration therewith.

The lock $d$ is withdrawn from operation by a cam-tooth $d^5$ upon a cam-disk $d^6$, mounted on the shaft $B^2$. This cam-tooth $d^5$ engages with the upper extremity of a lever $d^7$, the lower end of which is pivoted to an upwardly-extending arm $d^8$ of the bracket $D^{10}$. A connection $d^9$ communicates motion from the lever $d^7$ to the lever $d^2$, and as said lever $d^7$ is forced outward by the cam $d^5$ the locking-rod $d$ is withdrawn from engagement with the notches $D^4$ to permit the operation of the carrier-rotating mechanism. It will be understood that these cams $D^8$ and $d^5$ are so timed in relation to each other that the latter operates before the former in order to release the carrier-lock before the operation of the carrier-rotating mechanism.

It is evident that instead of the mechanical movements described there are others which will actuate the carrier-disk, momentarily lock the same, and then release it before the operation of the actuating mechanism; but those described are particularly applicable when used in connection with the additional actuating mechanisms of our machine.

E represents the main bottle-support, Figs. 9, 12, 13, and 14, which is brought into contact with the base of the bottle in order to support it during the operation of the compressor, cork-inserter, and the mechanism for securing to the bottle strands of wire projecting therefrom at an angle. This support E is so arranged in relation to the yielding bottle-support $c^3$ and the notches $D^4$ of the feed or carrier actuating disk D that the movement of the feed-arms from their starting to their first stopping position takes the bottle from the yielding support $c^3$ to a point directly over the main support E, which is then raised upward into contact with the bottle. By thus bringing the tops of the bottles to the same plane and raising and lowering the bottle-support the utility of the machine is enhanced, since the bottles vary in length and by the subsequent operations of our machine would otherwise become injured.

The support E may be of desirable form, size, and construction, but as here illustrated consists of the top plate $E'$ and the downwardly-extending shank $E^2$, which passes through a plain opening in the bracket $d'$ and the screw-threaded hub $E^3$, being preferably screw-threaded in order to enable a greater adjustment than would otherwise occur from its natural up-and-down movement. The shank $E^2$ is firmly held in the hub $E^3$ by a screw or other clamp $E^4$.

$E^5$ represents a lever pivoted at $E^6$ to the box-shaped frame $d^3$, with its free extremity secured to the screw-threaded hub $E^3$ and its rear extremity adapted to be elevated and depressed by a cam $E^7$, and the springs $e^5$ and $D^{15}$. (Best seen at Figs. 8, 9, 12, 13, 14, and 15.) The cam E is mounted upon the gear $b^3$ and contacts with the upper extremity of a lever $E^8$, having its lower extremity pivoted to the bracket $D^{10}$. A connection $E^9$ is pivoted to the free extremity of the lever $E^8$ and the rear extremity of a rack, $E^{10}$ movable to and fro in guides $E^{11}$, formed in the bracket $d^3$.

As presently described, the springs $e^5$ and $D^{15}$ normally force the bottle-support to its elevated position and the rear extremity of the lever $E^5$ to its depressed position, as seen in Figs. 13 and 14.

Projecting from the rear extremity of the lever $E^5$ is an arm $E^{12}$, against which by the forward movement of the rack $E^{10}$ is forced a roller $E^{13}$, journaled upon the side of said rack.

$e'$ represents a pinion, which meshes with the rack $E^{10}$ and is keyed to the shaft or spindle $e^2$, journaled in lugs $e^3$ on the bracket $d^3$. Rigidly mounted on the spindle $e^2$ is a cam $e^4$, to which is secured one extremity of a spring $e^5$, having its opposite extremity $e^6$ secured to the bracket $d^3$, whereby the spring $e^5$ tends constantly to rotate the cam $e^4$, forces downward the rear extremity of the lever $E^5$, and elevates the bottle-support. The tension of the spring $e^5$ is, however, insufficient to retract the rack $E^{10}$ and can only force the rear extremity of the lever $E^5$ downward when said rack is retracted. It will thus be understood that as the cam $E^7$ contacts with the lever $E^8$ the bottle-support is lowered, and after the passage of said cam the same spring $D^{15}$ that withdraws the lever $D^9$ retracts the lever $E^8$ and withdraws the rack $E^{10}$, thus enabling and aiding the spring $e^5$ to rotate the cam $e^4$ and force the support E against the bottle with a spring-pressure, which permits the bottle-support to readily adjust itself to the difference in the length of the bottles. The cam $e^4$ then prevents any rocking of the lever $E^5$, as would otherwise be occasioned during the subsequent operations of our machine, and firmly holds the same until the rack $E^{10}$ rotates the spindle $e^2$ and retracts said cam. To obviate too sudden an elevation of the support E, the cam $E^7$ is provided with the inwardly-extending end $E^{14}$.

The mechanism F for feeding the corks $W'$ one by one to the cork-compressor H may be of any desirable form, size, and construction to attain the desired end and is preferably mounted upon the upper end of the bracket $F'$, rising from the table A. The preferable form of cork-feed is best shown at Figs. 16, 17, 18, 19, and 20, and consists of a hopper $F^2$, a feeding-tube $F^3$, and a cut-off or trip $f$. The hopper $F^2$ is of desirable form, being preferably tapered at its lower extremity and formed with its upper end detachable. As best seen in Fig 16, the lower end $F^4$ is formed with shoulders $F^5$, against which bears the movable shoulder or nut $F^8$ of a bolt $F^6$, having its upper extremity pivoted to lugs $F^7$ on the adjacent portion of the hopper.

The lower portion $F^4$ of the cork-hopper is preferably composed of opposite halves, as shown in Fig. 20, each of which is formed on opposite sides of the center with projecting lugs $F^9$, one set being hinged and the other secured together by a movable or swinging pin $F^{18}$, which may be withdrawn to enable one division to swing from the other. The hopper and its feeding-tube are held by a support $F^{10}$, one end of which is mounted in the extremity of a lateral arm $F^{11}$, formed on the bracket $F'$. The opposite or free extremity of the support $F^{10}$, as best seen in Fig. 19, is composed of halves $F^{12}$, hinged together in like manner to the hinged sections of the lower end of the cork-hopper.

The cork-feeding tube $F^3$ is preferably composed of a series of wires, in order that the corks may be readily seen in passage, and it extends from the support $F^{10}$ to the compressor H.

$F^{13}$ represents an agitator or conveyer journaled within the cork-hopper, with its lower extremity extended downwardly into the central opening of the support $F^{10}$, that forms a continuation of the feeding-tube $F^3$. This agitator is preferably composed of a spirally-bent bar tapering downwardly from its upper to its lower extremity.

$F^{14}$ is a wheel journaled between the lower end $F^4$ of the cork-hopper and its support $F^{10}$ upon rollers $F^{19}$ and rigidly secured to the lower extremity of the feed or conveyer $F^{13}$, whereby it is rotated within the hopper $F^3$ and the corks fed down the center of said feed into the tube $F^3$. Motion is communicated to this wheel $F^{14}$ by a belt $F^{15}$, which passes over idlers $F^{16}$ upon the bracket $F'$ and over a pulley $F^{18}$ upon the main shaft B. It will thus be seen that as our bottling-machine operates the corks are constantly fed down the feed-tube $F^3$.

In order to govern the feed of the corks and prevent more than one at a time feeding into the compressor and to feed each cork into the compressor when in its open position, we use a cut-off or trip $f$, that is actuated by the compressor raising and lowering lever $F^{20}$. The cam $G'$ for raising and lowering the lever $F^{20}$ as preferably constructed is secured to a gear-wheel $G^2$, mounted on the shaft and meshing with the gear $b^2$ upon the main shaft B. Upon the rear extremity of the lever $F^{20}$ is a roller $G^4$ for engaging the camway $G^5$ of the cam $G'$, and thus raising and lowering the lever $F^{20}$. At the forward end of the lever $F^{20}$ is a cam or slotted lug $f'$, with which is engaged one arm $f^2$ of a lever $f^3$, pivoted at $f^4$ to a bracket $f^5$, that extends laterally from an upright arm $I^3$ of the bracket $C^2$. This bracket $f^5$ also serves to support the lower end of the feeding-tube $F^3$. An arm $f^7$ of the lever $f^3$ extends downwardly and forwardly into a slot between the bars of the cork-feed $F^3$ and prevents the downward feeding of the corks when the lever $F^{20}$ is in its depressed position. A third arm of the lever $f^3$ extends upwardly and rearwardly, carrying a forwardly-extending arm $f^9$, pivoted thereto at $f^{10}$. A spring $f^{11}$ holds said pivoted arm $f^9$ in its normal position, and when the lever $F^{20}$ is in its elevated position this arm $f^9$, as shown at Fig. 17, enters the slot in the feed-tube, permits a single cork to pass downwardly, and prevents further feeding of the imposed corks. To permit this downward feeding of the single cork, it will be understood that by the upward movement of the lever $F^{20}$ the arm $f^7$ of the cut-off or trip is withdrawn from the feeding-tube. As presently set forth, this lever $F^{20}$ raises and lowers the compressor, the jaws of which are at the same time open to receive the cork, and as the same lever operates the cut-off to admit a cork it is obvious that the cork is admitted only when the compressor is in condition to receive it and that until that time the feeding of the corks is prevented. The compressor H is also of desirable form, size, and construction suitable for receiving the cork and compressing the same to the desired size for entrance into the bottle, and, as previously set forth, the compressor is moved toward and away from the bottle for capping over its top and preventing the escape of the cork. The compressor, as best seen at Figs. 17 and 21 to 28, inclusive, preferably consists of a forward or main jaw $H'$, side jaws $H^2$, and a rear jaw $H^3$. The side jaws at their lower extremities are preferably hinged to the main jaw at $H^4$ and at their upper extremities are provided with rollers $H^5$, movable in diverging guides $H^6$, formed in the opposite sides of the compressor-supporting bracket $H^7$, which consists of a lateral extension on the bracket $F'$. The rear jaw $H^3$ is movable through an opening $H^8$ in the rear of the main jaw and is supported on the rod $H^9$, which by a cam $H^{11}$ is moved to and fro in a suitable guide or guides $H^{10}$. This cam is also formed on the gear $G^2$, and it will be understood that the cams $H^{11}$ and $G'$ are so timed in relation to each other that before the latter, as previously described, operates to raise the forward extremity of the lever $F^{20}$ and opens the side compressor-jaws the former operates to retract the rear jaw $H^3$, as best seen in Fig. 17. As the compressor moves downward and caps over the top of the bottle that, as previously described, is then aligned with the main bottle-support E the inserted cork is compressed sidewise between the side jaws $H^3$, which are closed by the downward movement of the compressor, after which the cam $H^{11}$ then operates to force the rear jaw forward between the side jaws and compress the cork from the rear to the desired size. These cams $G'$ and $H^{11}$ operate continuously and the compressor is alternately opened to receive the cork and closed to compress it; but the cams are so arranged in relation to the feed or carrier actuating and locking mechanism that after, as immediately described, the cork is driven from the compressor the carrier is partially rotated and locked before the completion of the compressor's downward movement, in order that the bottle may be first aligned therewith before being capped. It will also be understood that the compressor raising and lowering cam $G'$ is so arranged in relation to the mechanism for raising and lowering the main bottle-support as to cause the compressor to cap the top of the bottle before the said bottle-support is brought into contact with the base of the bottle for preventing any fracture of the bottle top by the downward movement of the compressor.

I represents the cork-inserter, which is also of desirable form, size, and construction and is best seen in Figs. 1, 2, 16, and 17. As preferably constructed, the inserter consists of a reciprocating rod having its lower end movable through the compressor to discharge the cork therefrom and its upper extremity secured to a cross-head I', guided in ways I² in the upright arm I³ of the bracket C².

I⁴ represents a lever pivoted at I⁵ to the upright F', with one extremity connected by a link I⁶ to the cross-head I' and the other extremity by a link I⁷ to a crank-disk I⁸ on the shaft B' above the main shaft.

As best seen in Figs. 2, 51, 52, and 60, the driving-gear b for actuating the shaft B' rotates loosely on the hub of a gear i', which is rigidly locked to the shaft and, as hereinafter described, is connected to operate the final twisting mechanism. Formed in the hub of the gear b is a pair of notches i², which are alternately engaged by a dog i³, movably mounted in the gear i' and formed with a concentric inner face normally held from engagement with the notches i² by a lock i⁵, of suitable construction. As best seen in Figs. 51 and 52, this lock consists of a sliding rod guided at its upper extremity in a bracket i⁶, mounted on the main shaft B, and at its lower extremity in a bracket i⁷ upon the table A. A collar i⁸ is rigidly secured to the sliding lock-rod i⁵, and interposed between said collar and the top of the bracket i⁷ is a spring i⁹ for constantly forcing the forward extremity of said lock-rod against the periphery of a shoulder i¹⁰ on the gear i'.

i¹¹ represents a collar rigidly secured to the lower extremity of the lock-rod i⁵ between the hubs i¹² of the bracket i⁷.

Mounted on the shaft B² beneath the main shaft is a cam i¹³, which contacts with the collar i¹¹, thus forcing the lower extremity of the rod downward within an opening (not shown) in the lower hub i¹², tensioning the spring i⁹, and releasing the extremity of the locking-rod i⁵ from engagement with the dog i³, whereupon the spring i⁴ rocks the dog i³ and engages its upper extremity with one of the notches in the gear b for setting the upper shaft B' in motion.

The compressor and bottle-support mechanisms are so timed with the cam i⁵ that the cork is not inserted until after the bottle is capped by the compressor, and that during its insertion the bottle is prevented from lengthwise movement by its support E. After the upward movement of the cork-inserter the lock i⁵ forces the dog i³ from operative engagement with the gear b, which then revolves loosely without transmitting motion to the shaft B'.

The wiring mechanism J may be of desirable form, size, and construction, and as preferably constructed consists of the wire-feeding mechanism and the wire-securing mechanism for securing strands of wire w to the bottle 1 with their extremities projecting therefrom at an angle and for twisting together said projecting extremities.

The wire-securing mechanism, as best seen at Figs. 1 to 3 and 29 to 36, inclusive, consists of a pair of shuttle-shafts J', arranged at an angle and preferably at right angles to each other and provided with a pair of shuttle or securing jaws. The shuttle-shaft J' is pivotally supported by and guided through a bracket J², hinged at J³ to an upright bracket J⁴ upon the table A. J⁵ represents a lever having one extremity pivoted at J⁶ to a cross-bar J⁷ between a pair of the standards A' and its upper end loosely connected to a collar J⁸, firmly secured to the shuttle-shaft. A pin J⁹ projects inwardly from the central portion of the lever J⁵ and is guided in the camway J¹⁰ of the cam J¹¹, which cam is mounted on a diagonally-extending shaft J¹², having motion communicated thereto from the lower shaft B² by gears J¹³ and J¹⁴, mounted upon the respective shafts B² and J¹², Figs. 2 and 29. It will thus be seen that as the cam J¹¹ is rotated the shuttle-shaft is forced toward and away from the bottle to secure the wire thereto with its extremities projecting. When forced toward the bottle, the shuttle-shaft J' is preferably raised upward in order to elevate the same above its top, as normally said shaft is beneath the top of the bottle. A cam J¹⁵ produces this elevation of the shuttle-shaft and is preferably secured directly to the cam J¹¹ previously described. J¹⁶ represents a lever, which is pivoted to a standard J¹⁷, rising from the table A, with one extremity pivoted to a loose collar J¹⁸ upon the shuttle-shaft and the other provided with a stud J¹⁹ for engaging the camway J²⁰ of the cam J¹⁵. As this cam is revolved it is obvious that the shuttle is forced upward and downward. The shuttle j consists, preferably, of a spindle tapering from its rear to its forward extremity and provided with a head or enlargement j². Pivoted to this head are jaws j³, having their adjacent extremities normally forced together by springs j⁴, which bear against shoulders j⁵ at the rear extremities of the shuttle-jaws.

We preferably use two strands of wire, wind the same around the tapering spindle, as presently described, and pass them through eyes j⁶ upon the head j², thence through openings j⁷ in the upper face of the head, and finally through guides j⁸, which lead to the extremity of the shuttle-jaws. When in their starting position, the feeding extremities of the wire project twisted together beyond the extremities of the shuttle-jaws, and after said jaws are registered with the top of the bottle, as shown in Fig. 29, they are dropped below the top of the bottle by the further operation of the cam J¹⁵, thus causing the wire to encircle the neck 2 of the bottle 1 beneath the shoulder 3. The shuttle-jaws are preferably dropped instantaneously, and as the cam J¹¹ then operates to withdraw the shuttle the spring-actuated jaws ride around the bottle until their forward extremities are clear, when they are immediately forced together by the springs j⁴, thus encircling its neck with strands of wire having their forward extremities twisted together. The shuttle-jaws are then retracted from the bottle, and during this movement the shaft J' is rotated and the strands of wire between the end of the shuttle-jaws and the bottle twisted together.

K represents a cam mounted on the spindle K' projecting from the bracket J⁴. Motion is communicated to this cam by a gear K² on the shaft B², which gear meshes with an internal gear K³, rigidly secured to the cam K. Guided in the camway of the cam K is a roller K⁴, supported at the central part of a lever K⁵, having its lower extremity pivoted to one of the legs A' and its upper extremity provided with a pair of engaging yokes K⁶ and K⁷. Rigidly secured to the shuttle-shaft J' is a pair of sliding clutch-sections K⁸ and K⁹, having inner clutch-faces and annular grooves for receiving the studs K¹⁰, secured to the said yokes K⁶ and K⁷. Loosely mounted on the shaft J' between the clutch-sections K⁶ and K⁷ is a pair of gears K¹¹, constantly driven in reverse directions by the gears K¹² on the main shaft B and the intermediary K¹³. When the roller K⁴ rests in the depression $k$ of the cam K, the lever K⁵ is in its rearward position and the forward clutch-section K⁹ is locked with the forward gear K¹¹, whereupon the shuttle-shaft rotates in the direction of the arrow 10. (Shown at Fig. 31.) On the contrary, when the stud K⁴ rides on the elevation $k'$ of the cam K the forward clutch-section K⁹ is disengaged from the forward gear and the rear one K⁸ is engaged with the rear gear K¹¹, thus rotating the shuttle-shaft in a reverse direction, as best seen in Fig. 35.

$k^2$ and $k^2$ represent surfaces on the cam K, which when engaged by the roller K⁴ so shift the lever K⁵ that neither the forward nor rearward clutch-sections are locked with the adjacent gears.

The camway J¹⁰ is composed of the divisions 4, 5, 6, 7, and 8, being so formed as to force the shuttle-jaws forward very quickly, to withdraw them equally quickly until clear of the bottle, to retract the jaws slowly for a short distance in order that tight twists $w'$ may be formed immediately adjacent to the bottle, to then retract the shuttle-jaws more quickly for forming looser twists $w^2$, and to then hold them in their rearward position and form tight twists immediately next to the shuttle-jaws. These divisions of the camway J¹⁰ of the cam J¹¹ are so timed in relation to the divisions $k$, $k'$, and $k^2$ of the cam K that during the forward movement of the shuttle-jaws and their retraction clear of the bottle no rotation of the shuttle-shaft takes place and that during its further retraction the shuttle-shaft is rotated to twist together the strands of wire as the retraction of the jaws feeds them out.

In order to stop the shuttle-jaws in a horizontal position, we provide a locking-bolt L, which is mounted in the bracket J² and adapted to engage a collar L', keyed to the shaft J'. The lock L is thrown into and out of operation by a lever L³, pivoted upon an arm of the bracket J⁴, with one extremity pivoted to the rod L and the other extremity movable upon the cam-face J²¹ of the cam J¹⁵. A spring L⁴ enables the lock to yield should the lever L³ force it against the periphery of the collar L' before the registration therewith of the receiving-notch L⁵, formed in said collar.

As best seen in Figs. 2, 16, and 37 to 45, inclusive, the wire-feeding mechanism consists of a pair of reels M for the separate pairs of wires, which reels are loosely mounted on a spindle M', supported in the upright bracket F'. Beneath the reels M is a pair of feeding-rollers M² and M³, the former being supported on a spindle M⁴ and driven by means of a belt M⁵, which passes over a pulley M⁶ on said spindle, an idler M⁷ upon the bracket F', and over a pulley M⁸ on the lower shaft B². The opposite roller M³ is mounted on a lever M¹⁰, being tightly held against the roller M² by means of a pair of rollers M¹¹, that bear against the opposite surface of the roller M² and are on the opposite ends of a supporting-frame M¹², which is secured by a spring M¹³ to a hub M¹⁴, mounted on the spindle for the roller M³.

M¹⁵ represents a plate in front of the roller M², through which the wire passes to the rear of the roller M², thence forwardly between the rollers M² and M³, beneath the plate M¹⁵, then over rollers N, mounted on the free extremity of a take up lever N', and finally over a roller N², supported in an arm N³, mounted on the collar J⁸, carried by the shuttle-shaft J' of the wire-applying mechanism. The separate strands of wire are held apart and prevented from tangling by means of guards $n$, which are arranged centrally with and extend beyond the rollers N and N². It will thus be understood that by the rotation of the feeding-roller M² the wire is constantly fed from the reel and by means of the rollers N and N² passes to the tapering spindle $j$ of the wire-applying mechanism.

As the wire-shuttle is moved forward into the position shown at Fig. 31, the rotation of the spindle winds the wire thereupon; but as the shuttle is afterward withdrawn and rotated in the opposite direction the wire is fed from the spindle $j$ through the medium of the shuttle-jaws to the bottle and the separate strands are twisted together. Meanwhile the feeding mechanism is continually feeding wire, and the take-up lever N' operates or raises to take up the slack until upon the further rotation of the shuttle-shaft J' the wire is again wound on the spindles. This take-up lever is secured to the lower extremity of a pivoted support N⁴, having its upper extremity provided with gear-teeth, which mesh with the segment N⁵, that is journaled on a spindle N⁶, supported on the frame F' above the spindle M⁴. A connection N⁷ is pivoted at one extremity to a projection of the segment N⁵ and is pivoted at its opposite extremity to one end of a link $N^8$, hinged upon the standard $F'$. Upon the shaft $G$ is a cam $G^6$, which raises and lowers the pivotal point of said connection $N^7$ and link $N^8$, thus rocking the segment and take-up lever $N'$. After the wire is twisted, as shown in Fig. 33, the wire-cutters (best seen in Figs. 3 and 46 to 50, inclusive) are by the cam $d^6$, previously described, actuated to sever the wire secured to the bottle from the wire-securing jaws. As has been also previously described, the wire-securing jaws are arranged at an angle with each other, and we use two opposite pairs of cutting-jaws for operating simultaneously to cut the wire from both of the shuttles.

P represents a lever having one extremity pivoted to the upwardly-extending bracket-arm $d^8$ and the other provided with a stud $P^{12}$, movable in the camway $P^{13}$ and pivoted to one end of a connection $P'$, the opposite end of which is flexibly connected to a cross-head $P^2$, that slides in grooves $P^3$, provided in the bracket $F'$.

$P^4$ represents a pair of brackets rising from the portion of the main frame interposed between the two shuttle-shafts, and $P^5$ represents a rocking spindle journaled in the brackets.

$P^6$ represents a lever having one extremity loosely mounted on the spindle $P^5$ and the other connected by a link $P^7$ to a pin $P^8$ on the cross-head $P^2$, whereby when the cross-head is moved to and fro the lever $P^6$ is rocked.

$P^9$ and $P^{10}$ represent a pair of levers loosely mounted on the spindle $P^5$ and held apart by a spring $P^{11}$, as best seen in Figs. 46 and 47.

The cutting-jaws $p$ and $p'$ are preferably so arranged that one is stationary and the other movable, with their respective cutting-edges $p^2$ and $p^3$ shearing one by the other, the stationary jaw $p$ being secured at $p^4$ to the lever $P^9$ and the movable jaw pivoted at $p^5$ to the stationary jaw and provided with an elongated recess $p^6$ for receiving the end of the lever $P^{10}$. As the cross-head $P^2$ moves forward to its dotted position, (shown in Fig. 46,) the link $P^7$ rocks the lever $P^6$ and an upwardly-extending shoulder $p^8$ thereon contacts with the lever $P^9$, whereupon by means of the spring $P^{11}$ forcing apart the levers $P^9$ and $P^{10}$ both cutting-jaws swing outward to the wire, which meanwhile is being twisted by the rearward movement of the shuttle-jaws. When the cross-head nears the limit of its movement, the movement of the lever $P^9$ is stopped by the abutment of its end shoulder $p^7$ with an upwardly-extending shoulder $p^9$ on the bracket $P^4$, whereupon the additional movement of the cross-head is sufficient to force the lever $P^{10}$ forward by the compression of the spring $P'$, and thus swing the movable jaw $p'$ on its pivot and shear off the wire. As by the further movement of the cam $d^6$ the cross-head returns to its rearward position, a shoulder $p^{10}$ on the lever $P^6$ bears against the lever $P^9$, and thus retracts both levers into their normal position to permit further operation of the wire-securing jaws.

The wire-cutting jaws are preferably moved into operative position just before the rotation of the shuttle-shafts is stopped, and in order to facilitate the forming of tight twists $w'$ immediately adjacent to the wire-securing jaws, as previously described, we prefer to use holding-jaws $p^{11}$ and $p^{12}$, which are mounted on the levers $P^9$ and $P^{10}$ in close proximity to the position of the shuttle-jaws when in their extreme rearward position, and as these jaws engage the wire before the stoppage of its twisting and preferably just after the rearward movement of the shuttles tight twists are thus formed between the wire-securing jaws and holding-levers, although, as previously set forth in the wiring-mechanism description the wire interposed between the holding-jaws and the tight twists immediately next to the bottle is twisted more loosely.

The holding-jaws $p^{11}$ and $p^{12}$ are of similar construction to the cutting-jaws $p$ and $p'$, with the exception of the downwardly-extending extremity of the movable holding-jaw $p^{12}$, which is provided with a downwardly-extending shoulder or arm $p^{13}$, for bearing against the outer face of the lever $P^{10}$, and a spring $p^{14}$, pivoted at $p^{15}$, with one extremity bearing against the inner face of the lever $P^{10}$ and the other against the pivotal pin $p^{16}$ of said movable holding-jaw. It will thus be seen that the spring $p^{14}$ compensates for the movement of the lever $P^{10}$ after the stoppage of the lever $P^9$, and forces the holding-jaws firmly together with a spring-pressure.

After the operation of the wire cutting and holding device it is apparent that secured to the corked bottle are strands of wire having their extremities twisted together and projecting therefrom at an angle with each other. These projecting extremities of the wire are then elevated by any suitable construction of lifting mechanism, preferably constructed as best seen in Figs. 1, 3, 5, and 7. As illustrated, these lifters are revoluble on the rod $C'$, in order that after the wire is cut the carrier or feed may be again released and actuated to feed a fresh bottle, while the wire-lifters by their rotation are elevating the twisted projecting strands previously applied, thus rendering our improved machine capable of great speed.

The lifters R consist of a series of levers arranged in pairs directly over the carrier-arms $C^5$ and supported by a revoluble disk $R'$, with their free extremities $r$ adapted to encircle the top of the bottle. By means of a stationary cam $R^2$ on the rod $C'$ these ends $r$ are depressed beneath the neck of the bottle during the operations of compressing and inserting the cork and securing strands of wire to the bottle, having projecting twisted extremities. The opposite ends of the levers R are pivoted to the plate $R^3$, which is supported on one end of a rod $R^4$, having its lower extremity passed through openings $r'$ in the supporting-disk R' and provided with a stud $r^2$, which rides in the camway of the cam $R^3$, thus elevating and depressing said levers, during which movement they are guided by means of a projection $r^3$, formed on one or both of each pair, and adapted to ride in guides $r^4$ in the hub of their supporting-disk. Immediately after the wire is cut off and the bottle feed or carrier commences its further movement the cam $R^2$ forces the wire-lifters upward from beneath the neck of the bottle and raises the projecting extremities above the top of the bottle. As presently described, a plate or tin $W^2$ is placed in position over the top of the cork, as shown at Fig. 68, and preferably just before the wire-lifters reach the limit of their closing movement, and immediately after the tin is operatively placed the outer ends $r$ of the levers are forced together to bring the projecting twisted extremities of the wire into position for engagement by the final twisting mechanism, also presently described.

$R^5$ represents a disk or plate journaled above the levers R upon the projecting end of the rod $R^4$. Beneath and rigid with this plate is the cam $R^6$, movable in recesses $r^5$ of the lifting-levers R, and rigidly secured to the top of the plate $R^5$ is the double-armed lever $R^7$, having its extremities adapted to be engaged by pins $r^6$ and $r^{10}$, respectively, depending from the gage-carrying plate $c'$. After the plate or tin is operatively placed the tin $r^6$ coincides with the shorter arm $r^7$, rocks it into the position shown at the right hand on Fig. 7, and forces the projecting strands of wire together. The second pin $r^{10}$, (shown also by dotted lines at Fig. 7, and arranged opposite to the former one,) encounters the longer arm $r^8$ and opens the wire-lifters after the operation of the final twisting mechanism and before a fresh bottle is aligned with said levers. The cam $R^6$ is so shaped as to lock the levers from inward movement in either their opened or closed position, and springs $r^9$ bear against their outer faces, causing their inner faces to bear firmly against the cam.

We will now proceed to describe the mechanism for feeding the plates or tins $W^2$ above the top of the cork, which preferably consists of a receptacle or tube for containing the plates, a feed for feeding the plate to the top of the cork, and a plunger for constantly forcing the plates toward the feeder. (See Figs. 51, 55, 57, 58, and 59.)

S represents a suitable plate-containing tube having its upper extremity preferably bell mounted and supported by a depending bracket S', mounted on the arm $C^2$. Movable in the tube is a plunger or screw $S^2$, having the plates or tins supported on its upper end, with its lower extremity guided in a bracket $S^3$ and provided with a ratchet $S^4$, loosely mounted thereon and adapted to carry a dog $S^5$, having one extremity pivoted to the ratchet $S^4$ and the other movable in the threads of the plunger $S^2$ for raising and lowering the same. Loosely hinged on the rod $S^3$ is a lever $S^6$, connected by the links $S^7$ and $S^8$ to an eye $S^9$ on the shuttle-actuating lever $J^5$. $S^{10}$ represents a dog pivoted to the lever $S^6$ and adapted to engage the teeth of the ratchet $S^4$ for raising the plunger, in order that the plate or tin may be fed upward as the wire-shuttle lever moves forward to align the wire-attaching jaws with the bottle. After all the tins are removed from the tube S it is removed and replaced by a filled one, and in order that the tubes may be self-supporting we form them with an enlarged base $S^{11}$.

The plate-feed proper $s$ may be of desirable form and construction, but preferably consists of a tube movable from the receptacle S to a point directly above the position assumed by the bottle previously wired, when the feed or carrier comes to a standstill. This tube $s$ is carried by and movable in rocking arms $s'$ and $s^2$, which are connected by the rod $s^3$, journaled in the bearing $s^4$. (Best seen in Figs. 55 and 57.)

G represents a shaft driven by gears $b^2$ and $G^2$, as previously set forth in the compressor mechanism description, and rigidly secured to this shaft is a disk having camways $s^5$ and $s^6$, the former of which moves the carrier-tube $s$ toward the receptacle S, and the latter rocks said receptacle downward into contact with the topmost plate or tin in the tube $s$ to take up the tin toward the bottle-top for depositing it in position.

$s^7$ represents a lever pivoted to the shaft G and provided with the guide $s^8$ for receiving a cross-head $s^9$, having one extremity provided with a pin $s^{16}$, engaging the camway $s^5$ and the other connected by a link $s^{10}$ to the projection $s^{11}$ of the tube-supporting arm $s^2$ for rocking the same toward and away from the receptacle S and the bottle-support. $s^{12}$ illustrates a lever similar to the lever $s^7$, and $s^{13}$ is a cross-head having one extremity movable in the guides $s^{17}$ of said lever and provided with a pin $s^{18}$, engaging the camway $s^6$, and the other end pivoted to an arm $s^{14}$ of the segment $s^{15}$, which segment engages teeth in the connecting-rod $s^3$, for elevating and depressing the plate-feed $s$. These camways $s^5$ and $s^6$ are so timed with each other that the feeding-tube $s$ is aligned with the bottle depressed to engage the top plate, elevated from said feeding-tube, then rocked outwardly into alignment with the bottle-feed, depressed for depositing the plate on the top of the cork, then elevated above the wire-lifting arms, and finally rocked backward into alignment with the plate-receptacle.

Owing to the air-spaces between the plates when the receptacle S is filled, it is necessary to move the feeding-tube $s$ into said receptacle a greater distance than when but few plates are above the plunger, and to provide for this difference in the movement of the feeding-tube and prevent injury thereto we permit it to slide through the carrying-arms $s'$ and $s^2$, and mount thereon a spring $s^{19}$, interposed between the shoulder $s^{20}$, rigidly secured to the feed $s$ and the upper arm $s'$.

T, Fig. 3, represents a disk on the shaft G, having eccentrically pivoted thereto a connection $T'$, which is flexibly connected to a piston $T^2$, movable up and down in an air-cylinder $T^3$, having its upper extremity pivoted on the spindle $I^5$ and provided with a small inlet-valve $T^4$ at its upper end to prevent collapse of the tube $T^5$, and its lower end provided with an outlet-opening $T^6$. A tube $T^5$ connects the cylinder $T^3$ and the tube $s$, whereby when by the movement of the eccentric or actuator T the piston is drawn downward, a vacuum is created in the feeding-tube $s$ sufficient to hold the plate, with which the lower extremity of said tube has been brought into contact. To facilitate this engagement said tube is provided with a rubber nozzle $t$. As soon as the tube $s$ is rocked from the receptacle S and depressed to the top of the cork, the vacuum within the cylinder $T^3$ is filled by the return movement of its piston and the plate is dropped in position, whereupon the plate-feeding apparatus is immediately withdrawn and the carrier moves onward.

To facilitate the perfect operation of the plate-feeding mechanism, the wire-lifters are provided with upwardly-projecting shoulders $r^{11}$, which form a guide for the tin plate in its passage to the bottle. It will thus be evident that conjointly with the operation of compressing the cork to the required size, inserting the cork into the bottle, and securing to the bottle twisted strands of wire, projecting therefrom at an angle, the plate-feeding mechanism of our apparatus is actuated to feed a plate over the top of the cork, the wire-lifters are slightly approximated after the placing of the plate, and the bottle is then registered with the final twisting mechanism. (Best shown in Figs. 62 and 63.)

The final twisting mechanism may be of desirable form and construction, but preferably consists of a pair of revoluble jaws U, pivoted at $U'$ to a spindle $U^2$, having one extremity mounted in the bracket $C^2$ and the other connected by gearing $U^3$ to the shaft $U^4$, which, by means of the gears $U^5$ and $i'$, is driven from the shaft $B'$. The upper extremities of the final twisting-arms U are pivoted to one extremity of toggle-levers $u$, the opposite extremities of which are pivoted to a collar $U^6$, that slides on the shaft $U^2$ and is engaged by one arm of a lever $U^7$, pivoted to a standard $U^8$, with its opposite arm connected by a link $U^9$ to an arm of the rocking lever $U^{10}$. The opposite end of the rocking lever $U^{10}$, as best seen in Figs. 16 and 39, is provided with a stud $U^{11}$, that moves in a camway $G^5$ of the cam $G'$, thus communicating motion to the lever $U^7$ for raising and lowering the sleeve $U^6$. This mechanism for raising and lowering the sleeve $U^6$ and rotating the shaft $U^2$ is so timed and arranged with the preceding mechanisms that when the bottle is in position beneath the final twisting-arms the sleeve $U^6$ is depressed and the lower extremities of the twisting-arms locked around the wire, whereupon the shaft $U^2$ revolves and twists the projecting extremities of the wire together over the top of the plate. After these ends are twisted together at $w^3$ the shaft $B'$ is at rest, as previously set forth in the cork-inserter description, and the camway $G^5$ is so arranged as to hold the sleeve $U^6$ in its normal position, with the twisting-arms separated.

In proximity to the final twisting mechanism is the final cutter V, (best seen in Figs. 64 to 67, inclusive,) which may be of suitable form and construction, although it preferably consists of a pair of cutting-jaws $V'$ and $V^2$, mounted on the spindle $V^3$, journaled in the bracket $C^2$. One of the cutting-jaws $V^2$ is pivoted to the other, and their cutting-edges are held apart by a spring $V^8$, interposed between pins or shoulders $V^9$ and $v'$ on the respective jaws $V'$ and $V^2$.

$V^4$ represents a lever having one extremity loosely connected at $v'$ to the cutting-jaw $V^2$, and the other connected by a link $V^5$ to a spring-actuated rocking lever $V^6$, which is forced outward by a cam $V^7$ on the shaft G. The lever $V^4$ is thereby swung toward the carrier, and by the pin $v'$ and the spring $V^8$ rocks the final cutting-jaws into engagement with the wire until the shoulder $V^{10}$ encounters the disk $c'$ and stops the jaw $V'$ from further movement, whereupon the spring $V^8$ is compressed by the further movement of the lever $V^4$, and the cutting-edge of the jaw $V^2$ sheared by that of the jaw $V'$. This final cutter is designed to clip off the extreme ends of the twisted wire and thus bring them all to a uniform height, and as the bottle rotates beneath the cutter the projecting end of the wire is forced firmly upon the tin plate, as shown in Fig. 68.

The operation of our invention is apparent from the foregoing description, and upon reference to the drawings, and it will be particularly noted that the parts are timed one with the other, so as to operate conjointly for the purpose of producing an effective, automatic, and practicable bottling-machine. Thus while a fresh bottle is being placed in operative position, a cork is being compressed and inserted into another, a plate of tin or other material placed upon the top of a third, and the projecting extremities of the wire secured to a fourth are being twisted over the top of the plate just placed in operative position. Moreover, during the operation of compressing and inserting the cork into one bottle the very same bottle is being provided with projecting strands of wire, and meanwhile the projecting strands of wire on the previously-corked bottle are being elevated and the plate placed in operative position. It is evident, however, that the operations of our machine may be somewhat varied from those shown and described, and that the construction may also be varied without departing from the spirit of our invention. Hence we do not limit ourselves to the precise order or timing of the operations or the specific construction of the parts.

It will be observed that we do not herein specifically claim the detail construction and arrangement of the wiring mechanism of our bottling-machine, as the same is reserved for our pending application, Serial No. 375,735, filed December 24, 1890.

Having thus fully described our invention, what we claim as new, and desire to secure by Letters Patent, is—

1. In a bottling-machine, the combination of the following mechanisms, to wit: for inserting the cork into the bottle, for placing a plate over the inserted cork, and for securing strands of wire to the bottle and over said plate, and connected mechanism between the foregoing parts for operating them conjointly, substantially as and for the purpose specified.

2. In a bottling-machine, the combination of the following mechanisms, to wit: for securing strands of wire to the bottle with their extremities projecting therefrom, for inserting the cork into the bottle, for placing a plate over the cork, for turning the wire over the plate, and for securing the wire in said position, and connected mechanism for operating the foregoing parts conjointly, substantially as set forth.

3. In a bottling-machine, the combination of the following mechanisms, to wit: for securing strands of wire to the bottle with their extremities projecting therefrom, for twisting together the projecting extremities of the wire, for inserting the cork into the bottle, for placing a plate over the inserted cork, for turning the projecting extremities over the plate, and for securing the wire in said position, and connected mechanism between the foregoing parts for operating them conjointly, substantially as and for the purpose set forth.

4. In a bottling-machine, the combination of the herein-described mechanisms, to wit: for securing strands of wire to the bottle with their extremities projecting therefrom, for securing a second number of strands to the bottle with their extremities projecting therefrom at an angle with the extremities of the first-secured strands, for inserting a cork into the bottle, for placing a plate above the cork, for turning the wire over the cork and plate, and for securing the wire in said position, and connected mechanism between the foregoing parts for operating them conjointly, substantially as specified.

5. In a bottling-machine, the combination of the herein-described mechanisms, to wit: for securing strands of wire to the bottle with their extremities projecting therefrom, for securing a second number of strands of wire to the bottle with their extremities projecting therefrom at an angle with the extremities of the first-secured strands, for twisting together the projecting extremities of the wire, for placing a plate above the inserted cork, for turning the wire over the plate and for twisting together the projecting previously-twisted extremities of the wire, and connected mechanism between the foregoing parts for operating them in due order, substantially as described.

6. In a bottling-machine, the combination, with a cork-inserter, of the following mechanisms, to wit: for securing strands of wire to the bottle with their extremities projecting therefrom, for twisting said projecting strands together with a tight twist immediately adjacent to the bottle, for twisting together the extremities of the wire with a looser twist, for placing a plate at the top of the bottle, for turning the twisted extremities over said plate, and for securing the wire in said position, and connected mechanism for operating the foregoing in due order, substantially as specified.

7. In a bottling-machine, the combination, with a cork-inserter, of the following mechanisms, to wit: for securing strands of wire to the bottle with their extremities projecting therefrom, for securing a second number of strands with their extremities projecting from the bottle at an angle with the extremities of the first-secured strands, for twisting the adjacent extremities of said strands together with a tight twist immediately adjacent to the bottle, for twisting together said adjacent extremities of the wire with a looser twist, for placing a plate upon the top of the cork, for turning the twisted extremities over said plate, and for securing the wire in said position, and connected mechanism for operating the foregoing parts in due order, substantially as and for the purpose set forth.

8. In a bottling-machine, the combination of a bottle-support with the following mechanisms, to wit: for inserting the cork into the bottle, for placing a plate upon the cork, and for securing strands of wire to the bottle and over the plate, and connected mechanism between the foregoing parts for operating them conjointly, substantially as and for the purpose described.

9. In a bottling-machine, the combination, with a bottle-support and a cork-inserter, of the following mechanisms, to wit: for securing strands of wire to the bottle with their extremities projecting therefrom, for securing a second number of strands of wire to the bottle with their extremities projecting therefrom at an angle with the extremities of the first-secured strands, for placing a plate above the cork, for turning the wire over the cork and plate, and for securing the wire in said position, and connected mechanism between the foregoing parts for operating them conjointly, substantially as and for the purpose set forth.

10. In a bottling-machine, the combination of a bottle-support, an inserter for inserting the corks, a movable feed for placing a plate over the cork, mechanism for securing strands of wire to the bottle and over the plate, and connected mechanism between the foregoing parts for operating them in due order, substantially as and for the purpose described.

11. In a bottling-machine, the combination, with a bottle-support, of the following mechanisms, to wit: for inserting the cork into the bottle, for placing a plate over the inserted cork, for securing strands of wire to the bottle and over said cork, for operating the wire-securing mechanism during the operation of said plate-feed, and connected mechanism between the foregoing parts for operating them conjointly, substantially as and for the purpose specified.

12. In a bottling-machine, the combination, with a cork-inserter and a bottle-support movable toward and away from the cork-inserter, of the following mechanisms, to wit: for securing strands of wire to the bottle with their extremities projecting therefrom, for securing a second number of strands of wire to the bottle with their extremities projecting therefrom at an angle with the extremities of the first secured strands, for placing a plate above the cork, for turning the wire over the cork and plate, and for securing the wire in said position, and connected mechanism between the foregoing parts for operating them conjointly, substantially as and for the purpose specified.

13. In a bottling-machine, the combination, with a cork-inserter, of a feed having a movement toward and away from the bottle for placing a plate upon the cork, wire-securing mechanism having a movement toward and away from the bottle for securing strands of wire thereto and over the inserted cork and said plate, and connected mechanism between the foregoing parts for operating them conjointly, substantially as and for the purpose set forth.

14. In a bottling-machine, the combination, with a bottle-support, of a cork-inserter having a movement toward and away from the support, a feed having a movement toward and away from the bottle for placing a plate upon the cork, wire-securing mechanism for securing strands of wire to the bottle and over the plate, and connected mechanism between the foregoing parts for operating them conjointly, substantially as and for the purpose described.

15. In a bottling-machine, the combination, with a cork-inserter having a movement toward and away from the bottle, of a feed having a movement toward and away from the bottle for placing a plate upon the cork, wire-securing mechanism for securing strands of wire to the bottle with their extremities projecting therefrom, a second wire-securing mechanism for securing a second number of strands to the bottle with their extremities projecting therefrom at an angle with the extremities of the strands first secured, mechanism for turning the wire over the inserted cork and plate, mechanism for securing the wire in said position, and connected mechanism between the foregoing parts for operating them conjointly, substantially as described.

16. In a bottling-machine, the combination, with a cork-inserter and wire-securing jaws, of the herein-described mechanisms, to wit: for operating the jaws to encircle the bottle, for placing a plate upon the inserted cork, for withdrawing said jaws to secure strands of wire to the bottle with their extremities projecting therefrom, for turning the projecting extremities over the plate, and for securing the wire in said position, and connected mechanism between the foregoing parts for operating them conjointly, substantially as specified.

17. In a bottling-machine, the combination, with a cork-inserter, of wire-securing jaws arranged at an angle with each other, mechanism for actuating said jaws toward and away from the bottle for securing strands of wire thereto with their extremities projecting at an angle therefrom, a feed for placing a plate upon the cork, and connected mechanism between the foregoing parts for operating them conjointly, substantially as set forth.

18. In a bottling-machine, the combination, with the cork-inserter, of wire-securing jaws arranged at an angle with each other, mechanism for actuating said jaws toward and away from the bottle for securing strands of wire thereto with their extremities projecting at an angle therefrom, a feed for placing a plate upon the cork, and a feed for feeding the bottles from the wire-securing jaws to said plate-feed, and connected mechanism between the foregoing parts for operating them in due order, substantially as described.

19. In a bottling-machine, the combination, with a cork-inserter, of wire-securing jaws movable toward and away from the bottle for securing strands of wire thereto with their extremities projecting therefrom, mechanism for rotating the jaws to twist together the projecting extremities of the wire, a feed for placing a plate upon the cork, mechanism for turning the projecting extremities over the plate, mechanism for securing the wire in said position, and connected mechanism between the foregoing parts for operating them conjointly, substantially as described.

20. In a bottling-machine, the combination of a cork-inserter and wire-securing jaws movable toward and away from the bottle for securing strands of wire thereto with their extremities projecting therefrom, with the following mechanisms, to wit: for rotating the jaws to twist together the projecting extremities, for stopping the rotation of the jaws in a horizontal plane, for placing a plate over the cork, for turning the wire over the plate, and for securing the wire in said position, and connected mechanism between the foregoing parts for operating them conjointly, substantially as described.

21. In a bottling-machine, the combination, with a feed for feeding the corks, of an inserter for inserting the corks into the bottles, a plate-feed for placing a plate over the inserted cork, mechanism for securing strands of wire to the bottle and over the plate, and connected mechanism between the foregoing parts for operating them conjointly, substantially as specified.

22. In a bottling-machine, the combination, with a feed for feeding the corks, of a cut-off for preventing the feeding of more than one cork at a time, a cork-inserter for inserting the corks into the bottles, a plate-feed for placing a plate over the inserted cork, mechanism for securing strands of wire to the bottle and over the plate, and connected mechanism between the foregoing parts for operating them conjointly, substantially as set forth.

23. In a bottling-machine, the combination of the herein-described mechanisms, to wit: for compressing the cork to the required size, for inserting the cork into the bottle, for placing a plate over the inserted cork, and for securing strands of wire to the bottle and over said plate, and connected mechanism between the foregoing parts for operating them conjointly, substantially as and for the purpose specified.

24. In a bottling-machine, the combination, with a feed for feeding the corks and a cut-off for preventing the feeding of more than one cork at a time, of the following mechanisms, to wit: for compressing the cork to the required size, for inserting it into the bottle, for placing a plate over the inserted cork, and for securing strands of wire to the bottle and over said plate, and connected mechanism between the foregoing parts for operating them conjointly, substantially as set forth.

25. The combination, with a movable bottle-feed, of the following mechanisms, to wit: for inserting the cork into the bottle, for placing a plate over the inserted cork, and for securing strands of wire to the bottle and over said plate, and connected mechanism between the foregoing parts for operating them conjointly, substantially as specified.

26. The combination of a feed for feeding the bottles, a cork-inserter, and a feed for feeding a plate upon the cork, with the following mechanisms, to wit: for actuating the plate-feed toward and away from the bottle-feed and for securing strands of wire to the bottle and over the inserted cork and plate, and connected mechanism between the foregoing parts for operating them conjointly, substantially as described.

27. The combination, with a rotary bottle-feed, of the following mechanisms, to wit: for inserting the cork into the bottle, for placing a plate over the inserted cork, and for securing strands of wire to the bottle and over said plate, and connected mechanism between the foregoing parts for operating them conjointly, substantially as and for the purpose set forth.

28. The combination, with a cork-inserter, of a feed for placing a plate upon the cork, wire-securing mechanism for securing strands of wire to the bottle and over the cork and plate, a bottle-feed having the bottles arranged thereon at intervals corresponding to the distance between the said plate-feed and wire-securing mechanism when in alignment with the bottle, and connected mechanism between the foregoing parts for operating them conjointly, substantially as set forth.

29. In a bottling-machine, the combination, with a cork-inserter, of a feed for placing a plate upon the cork, wire-securing mechanism for securing strands of wire to the bottle and over said cork and plate, a bottle-feed for feeding the bottles from the wire-securing mechanism to the plate-feed, and connected mechanism between the foregoing parts for operating them conjointly, substantially as specified.

30. In a bottling-machine, the combination, with a bottle-feed, of the following mechanisms, to wit: for securing strands of wire to the bottle with their extremities projecting, for placing a plate upon the inserted cork, for turning the projecting extremities of the wire over the top of the plate, for securing the wire in said position, said former and latter wire-securing and plate-feeding mechanisms being equidistant from each other when in alignment with the bottle, and connected mechanism between the foregoing parts for operating them in due order, substantially as set forth.

31. In a bottling-machine, the combination, with a bottle-feed having a series of bottles arranged thereon, of the following mechanisms, to wit: for securing strands of wire to the bottle with their extremities projecting, for placing a plate upon the inserted cork, for turning the projecting extremities of the wire over the top of the plate, and for securing the wire in said position, said former and latter wire-securing and plate-feeding mechanisms being arranged in the line of a circle when in alignment with the bottle, and connected mechanism between the foregoing parts for operating them in due order, substantially as described.

32. In a bottling-machine, the combination, with a cork-inserter, of a feed for placing the plate upon the cork, wire-securing mechanism for securing strands of wire to the bottle with their extremities projecting therefrom, a second wire-securing mechanism for securing a second number of strands with their extremities projecting from the bottle at an angle with the extremities of the first-secured strands, and a bottle-feed having the bottles arranged thereon at intervals corresponding to the distance between the said plate-feed and wire-securing mechanisms when in alignment with the bottle, and connected mechanism between the foregoing parts for operating them in due order, substantially as specified.

33. The combination, with a cork-inserter, of a feed for placing a plate upon the cork, wire-securing mechanism for securing strands of wire to the bottle with their extremities projecting therefrom, a second wire-securing mechanism for securing a second number of strands with their extremities projecting from the bottle at an angle with the extremities of the first-secured strands, mechanism for turning the projecting extremities over the top of the inserted cork and plate, mechanism for securing the wire in said position, and a bottle-feed having the bottles arranged thereon at intervals corresponding to the distance between the positions of said plate-feed and the former and latter wire-securing mechanism when aligned with the bottle, and connected mechanism between the foregoing parts for operating them in due order, substantially as set forth.

34. In a bottling-machine, the combination, with a cork-inserter, of a feed for placing a plate upon the cork, wire-securing mechanism for securing strands of wire to the bottle with their extremities projecting therefrom, a bottle-feed for feeding the bottles from the wire-securing mechanism to the plate-feed, and movable arms on said bottle-feed for grasping and releasing the bottles, and connected mechanism between the foregoing parts, substantially as and for the purpose described.

35. In a bottling-machine, the combination, with a cork-inserter, of a feed for placing the plate upon the cork, wire-securing mechanism for securing strands of wire to the bottle with their extremities projecting therefrom, a bottle-feed for feeding the bottles from the wire-securing mechanism to the plate-feed, and bottle-grasping arms arranged on the feed at intervals corresponding to the distance between said wire-securing mechanism and plate-feed when in alignment with the bottle, and connected mechanism between the foregoing parts for operating them in due order, substantially as specified.

36. In a bottling-machine, the combination, with a cork-inserter, of a feed for placing a plate upon the cork, wire-securing mechanism for securing strands of wire to the bottle with their extremities projecting therefrom, a second wire-securing mechanism for securing a second number of strands with their extremities projecting from the bottle at an angle with the extremities of the first-secured strands, a bottle-feed for feeding the bottles from the wire-securing mechanism to the plate-feed, and bottle-grasping arms arranged on the feed at intervals corresponding to the distance between said wire-securing mechanisms and plate-feed when in alignment with the bottle, and connected mechanism between the foregoing parts for operating them conjointly, substantially as described.

37. In a bottling-machine, the combination, with a bottle-feed having grasping-faces movable toward and away from each other in a coincident plane, of the following mechanisms, to wit: for inserting the cork into the bottle, for placing a plate over the inserted cork, and for securing strands of wire to the bottle and over said plate, and connected mechanism between the foregoing parts for operating them conjointly, substantially as and for the purpose specified.

38. In a bottling-machine, the combination, with jaws for securing strands of wire to the bottle, of the following mechanisms, to wit: for withdrawing the jaws to feed out the wire, for cutting off the wire secured to the bottle from said jaws, for inserting the cork, for placing a plate over the inserted cork, for turning the projecting extremities of the wire over the plate, and for securing the wire in said position, and connected mechanism between the foregoing parts for operating them conjointly, substantially as set forth.

39. In a bottling-machine, the combination, with jaws arranged at an angle with each other for securing strands of wire to the bottle with their extremities projecting therefrom at an angle, of the following mechanisms, to wit: for withdrawing the jaws to feed out the wire, for cutting off the wire midway between the jaws and bottle, for inserting the cork, for placing a plate over the inserted cork, for turning the projecting extremities of the wire over the plate, and for securing the wire in said position, and connected mechanism between the foregoing parts for operating them conjointly, substantially as and for the purpose described.

40. In a bottling-machine, the combination, with a feed or carrier and a gage for bringing the bottle to the desired position in the feed, of the following mechanisms, to wit: for inserting the cork into the bottle, for placing a plate over the inserted cork, and for securing strands of wire to the bottle and over said plate, and connected mechanism between the foregoing parts for operating them conjointly, substantially as and for the purpose described.

41. In a bottling-machine, the combination, with a feed or carrier, a gage for bringing the bottles to the desired position in the feed, and a spring-actuated support beneath the gage, of the following mechanisms, to wit: for inserting the cork into the bottle, for placing a plate over the inserted cork, and for securing strands of wire to the bottle and over said plate, and connected mechanism between the foregoing parts for operating them conjointly, substantially as and for the purpose set forth.

42. In a bottling-machine, the combination of a movable feed for feeding the bottles, arms on the feed for holding and releasing the bottles, and a gage for bringing the bottles into the desired position with the following mechanisms, to wit: for inserting the cork into the bottle, for placing a plate over the inserted cork, and for securing strands of wire to the bottle and over said plate, and connected mechanism between the foregoing parts for operating them conjointly, substantially as and for the purpose described.

43. The combination, with a bottle-feed, of wire-securing mechanism for securing strands of wire to the bottle with their extremities projecting therefrom, a movable jaw for elevating the extremities of the wire, a feed for placing the plate over the inserted cork, mechanism for turning the wire over the plate, mechanism for securing the wire in said position, and connected mechanism between the foregoing parts for operating them conjointly, substantially as specified.

44. The combination, with a bottle-feed, of wire-securing mechanism for securing strands of wire to the bottle with their extremities projecting therefrom, a pair of jaws movable lengthwise of the bottle for elevating the projecting extremities of the wire, a feed for placing a plate upon the top of the bottle, mechanism for turning the elevated projecting extremities of the wire over the bottle, mechanism for securing the wire in said position, and connected mechanism between the foregoing parts for operating them in due order, substantially as and for the purpose set forth.

45. The combination, with a bottle-feed, of wire-securing mechanism for securing strands of wire to the bottle with their extremities projecting therefrom, a pair of jaws movable lengthwise of the bottle for elevating the projecting extremities of the wire, a feed for placing a plate upon the top of the bottle, mechanism for turning the elevated projecting extremities of the wire over the bottle, rotating jaws for twisting together the elevated projecting extremities of the wire, and connected mechanism between the foregoing parts for operating them in due order, substantially as and for the purpose described.

46. In a bottling-machine, the combination of a feed for placing a plate upon the bottle, a feed for feeding the bottles, a lock for locking the carrier, mechanism for securing strands of wire to the bottle and over the plate, and connected mechanism between the foregoing parts for operating them in due order, substantially as and for the purpose set forth.

47. The combination, with a bottle-feed, of a feed for placing a plate upon the bottle, said plate-feed being movable toward the bottle-feed in planes at substantially right angles to each other, and connected mechanism between the foregoing parts for operating them in due order, substantially as and for the purpose specified.

48. The combination, with mechanism for securing strands of wire to the bottle with their extremities projecting therefrom, of arms for elevating the projecting extremities of the wire, guides in said arms, a feed for passing a plate through the guides to the bottle, mechanism for turning the wire over said plate, mechanism for securing the wire in said position, and connected mechanism between the foregoing parts for operating them conjointly, substantially as described.

49. In a bottling-machine, the combination, with mechanism for securing strands of wire to the bottle with their extremities projecting therefrom, of a receptacle for containing a series of plates, a feed movable from said receptacle toward the bottle, mechanism for turning the wire over the plate, mechanism for securing the same in said position, and connected mechanism between the foregoing parts for operating them in due order, substantially as set forth.

50. In a bottling-machine, the combination of a rotary bottle-feed, a feed movable to and from the bottle-feed for placing a plate upon the bottle, and connected mechanism between said parts, substantially as described.

51. In a bottling-machine, the combination of a receptacle for the plates, a feed movable from said receptacle to the bottle for placing a plate upon the bottle, wire-securing mechanism for securing the plate to the bottle, and connected mechanism between the foregoing parts for operating them in due order, substantially as specified.

52. In a bottling-machine, the combination of a receptacle for the plates, a feed movable toward and away from the receptacle for feeding the plates therefrom to the bottle, wire-securing mechanism for securing the plate to the bottle, and connected mechanism between the foregoing parts for operating them in due order, substantially as set forth.

53. In a bottling-machine, the combination of a receptacle for the plate and a feed for feeding a plate to the bottle, with the following mechanisms, to wit: for forcing the feed lengthwise to the receptacle, for forcing said feed horizontally toward the bottle, and for securing the plate upon the bottle, and connected mechanism between the foregoing parts for operating them in due order, substantially as described.

54. In a bottling-machine, the combination of a support for the plate, a tube movable toward and away from said support for placing a plate upon the bottle, a suction device for creating a vacuum in said tube to support the plate in its passage to the bottle, mechanism for securing the plate in said position, and connected mechanism between the foregoing parts for operating them in due order, substantially as specified.

55. In a bottling-machine, the combination of a rotary bottle-feed for feeding the bottles, a support for the plates, a tube movable toward and away from said support for placing a plate upon the bottle, a suction device for creating a vacuum in said tube to support the plate in its passage to the bottle, mechanism for securing the plate in said position, and connected mechanism between the foregoing parts for operating them in due order, substantially as set forth.

56. In a bottling-machine, the combination of a support for the plate, a tube for feeding the plate from said support to the bottle, a vacuum-cylinder for creating a vacuum in the feeding-tube, a flexible connection between said cylinder and tube, mechanism for securing the plate in said position, and connected mechanism between the foregoing parts for operating them in due order, substantially as set forth.

57. In a bottling-machine, the combination, with a plate-support and a tube for feeding the plate to the bottle, of the following mechanisms, to wit: for forcing said tube toward said support in planes at substantially right angles to each other, for intermittently creating a vacuum in the feeding-tube to enable the same to support and release the plate and for securing the plate in said position, and connected mechanism between the foregoing parts for operating them in due order, substantially as described.

58. In a bottling-machine, the combination of a movable bottle-feed, a receptacle for the plate, a plunger movable in said receptacle, and a movable feed for feeding the plates from said receptacle to the bottle, substantially as and for the purpose set forth.

59. In a bottling-machine, the combination of a support for the plates, a tube movable between said support and the bottle for placing the plate in position, and a suction device for creating a vacuum in said tube to support the plate in its passage to the bottle, substantially as and for the purpose described.

60. In a bottling-machine, the combination of a receptacle for the plates, a movable support in said receptacle for feeding the plates outward, a tube movable between said receptacle and the bottle for placing the plate in position, and a suction device for creating a vacuum in said tube to support the plate in its passage to the bottle, substantially as and for the purpose specified.

61. In a bottling-machine, the combination of a receptacle for the plates, a movable plunger within said chamber having a screw-threaded shank, a nut for elevating said shank, and a feed for conveying the plates from said receptacle to the bottle, substantially as set forth.

62. In a bottling-machine, the combination of a receptacle for the plates, a movable plunger within said chamber having a screw-threaded shank, a nut for elevating said shank, a tube movable between said receptacle and the bottle for placing the plate in position, and a suction device for creating a vacuum in said tube to support the plate in its passage to the bottle, substantially as described.

63. In a bottling-machine, the combination, with a movable plunger, of a removable plate-receptacle having a central opening for receiving said plunger, a suitable base on said receptacle for supporting the same when removed, and a feed for feeding the plates from said receptacle to the bottle, substantially as set forth.

64. In a bottling-machine, the combination of a support for the plates, a feed for conveying the plates from said support to the bottle, and a spring for permitting the feed to yield on its support when encountered with the plate, substantially as described.

65. In a bottling-machine, the combination of a support for the plates, a tube for feeding the plates from the support to the bottle, a movable support for said tube for forcing the same toward the plate, and a spring for permitting the tube to yield when encountered with the plate, substantially as specified.

66. In a bottling-machine, the combination of a support for the plate, a feed for feeding the plates from the support to the bottle, a support for the feed, a lever for moving the feed-support toward the plate-support, and a second lever for moving the feed-support toward the bottle, substantially as and for the purpose described.

67. In a bottling-machine, the combination of a support for the plate, a feed for feeding the plates from the support to the bottle, a support for the tube, a lever for moving the feed-support toward the plate-support, a second lever for moving the feed-support toward the bottle, and a spring for permitting the feed to yield on its support when encountered with the plate, substantially as specified.

68. In a bottling-machine, the combination of a support for the plates, a tube movable toward and away from said support, a hinged vacuum-cylinder, a piston movable in said cylinder, a rotary disk secured to said piston, and a connection between said tube and piston for creating a vacuum in the tube, substantially as set forth.

69. In a bottling-machine, the combination of a support for the plates, a tube for feeding the plates to the bottle, a support for said tube, movable toward and away from the plate-support and toward and away from the bottle, a hinged vacuum-cylinder, a flexible connection between the vacuum-cylinder and the tube for creating a vacuum in the tube, a piston movable in the vacuum-cylinder, and a rotary actuator for the piston, substantially as specified.

In testimony whereof we have hereunto signed our names, in the presence of two attesting witnesses, at Rochester, in the county of Monroe and State of New York, this 17th day of May, 1890.

SOL. WILE.
HENRY LA CASSE.

Witnesses:
F. W. WHIPPLE,
FRANK M. GOFF.